US011556546B2

(12) United States Patent
Abbasi Moghaddam et al.

(10) Patent No.: US 11,556,546 B2
(45) Date of Patent: Jan. 17, 2023

(54) PEOPLE SUGGESTER USING HISTORICAL INTERACTIONS ON A DEVICE

(71) Applicant: Apple Inc., Cupertino, CA (US)

(72) Inventors: Saeed Abbasi Moghaddam, San Jose, CA (US); Joao Pedro Lacerda, Santa Cruz, CA (US); Joseph E. Meyer, Bethesda, MD (US); Chiraag Sumanth, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 16/835,075

(22) Filed: Mar. 30, 2020

(65) Prior Publication Data

US 2020/0380003 A1 Dec. 3, 2020

Related U.S. Application Data

(60) Provisional application No. 62/856,042, filed on Jun. 1, 2019.

(51) Int. Cl.
*G06F 16/2457* (2019.01)
*G06F 3/04817* (2022.01)
(Continued)

(52) U.S. Cl.
CPC ...... *G06F 16/24575* (2019.01); *G06F 3/0482* (2013.01); *G06F 3/04817* (2013.01);
(Continued)

(58) Field of Classification Search
CPC ......... G06F 16/24575; G06F 16/24578; G06F 16/248; G06F 3/04817; G06F 3/0482; H04M 1/72569; H04M 1/72586
See application file for complete search history.

(56) References Cited

U.S. PATENT DOCUMENTS 9,116,596 B2 8/2015 Roman et al.
9,183,515 B2 11/2015 Gundotra et al.
(Continued)

FOREIGN PATENT DOCUMENTS

CN 105550933 A * 5/2016 ......... G06Q 30/0261
WO 2015/182345 A1 3/2015

OTHER PUBLICATIONS

Kim et al., "High5: Promoting Interpersonal Hand-to-Hand Touch for Vibrant Workplace With Electrodermal Sensor Watches." *UbiComp* '14, Sep. 13-14, 2014, Seattle, WA, USA. ACM 978-1-4503-2968-2/14/09. 5 pages.
(Continued)

*Primary Examiner* — Maryam M Ipakchi
(74) *Attorney, Agent, or Firm* — Kilpatrick Townsend & Stockton LLP

(57) ABSTRACT

Systems and methods can suggest applications and/or recipients for a user of a computing device to perform communication. The suggestions can be provided on a user interface for a user to select. A suggestion engine can use historical user interactions that include a recipient, a communication application used to communicate with the recipient, and contextual data to determine which application and/or recipients to suggest. The user interactions may occur in a variety of ways, e.g., after a content object has been selected within a host application, where a communication application is selected thereafter. Multiple models may be used to provide the suggestions, such as a pattern model or a cluster model that uses recent user interactions. As another example, a heuristics model may also be used.

23 Claims, 10 Drawing Sheets

(51) Int. Cl.
*G06F 3/0482* (2013.01)
*H04M 1/72454* (2021.01)
*H04M 1/72472* (2021.01)
*G06F 16/248* (2019.01)

(52) U.S. Cl.
CPC ...... *G06F 16/248* (2019.01); *G06F 16/24578* (2019.01); *H04M 1/72454* (2021.01); *H04M 1/72472* (2021.01)

(56) References Cited

U.S. PATENT DOCUMENTS

| | | |
|---|---|---|
| 9,563,488 B2 | 2/2017 | Fadel et al. |
| 10,356,020 B2 | 7/2019 | Chao et al. |
| 10,817,791 B1 | 10/2020 | Shoemaker et al. |
| 10,846,612 B2 | 11/2020 | Keysers et al. |
| 2015/0081783 A1 | 3/2015 | Gong et al. |
| 2015/0134389 A1 | 5/2015 | Punera et al. |
| 2015/0347200 A1 | 12/2015 | Fadel et al. |
| 2017/0068906 A1* | 3/2017 | Korycki ............... G06N 7/005 |
| 2017/0093774 A1 | 3/2017 | Arastafar et al. |
| 2017/0235848 A1* | 8/2017 | Van Dusen ............ G06N 20/00 705/12 |
| 2017/0250940 A1* | 8/2017 | Chao .................... H04L 67/535 |
| 2018/0032997 A1* | 2/2018 | Gordon ............. G06Q 30/0269 |
| 2018/0052587 A1 | 2/2018 | LaPier et al. |
| 2018/0349659 A1 | 12/2018 | Manzari et al. |
| 2018/0367484 A1 | 12/2018 | Rodriguez et al. |
| 2018/0373415 A1 | 12/2018 | Dellinger et al. |
| 2019/0102396 A1 | 4/2019 | Pan et al. |
| 2019/0138951 A1 | 5/2019 | Brownhill et al. |
| 2019/0139150 A1 | 5/2019 | Brownhill et al. |
| 2019/0347181 A1 | 11/2019 | Cranfill et al. |
| 2019/0392345 A1 | 12/2019 | Adaska et al. |
| 2021/0081227 A1 | 3/2021 | Verma et al. |

OTHER PUBLICATIONS

Srinivasan, Vijay et al., "Mobileminer; Mining Your Frequent Patterns on Your Phone." UbiComp, Sep. 13-17, 2014, Seattle, Washington. 12 pages.

U.S. Appl. No. 16/880,408, Notice of Allowance, dated Aug. 2, 2022, 10 pages.

* cited by examiner

PEOPLE SUGGESTER USING HISTORICAL INTERACTIONS ON A DEVICE

CROSS-REFERENCES TO RELATED APPLICATIONS

This application claims the benefit of U.S. Provisional Application No. 62/856,042, filed Jun. 1, 2019, entitled "PEOPLE SUGGESTED USING HISTORICAL INTERACTIONS ON A DEVICE," the disclosure which is incorporated by reference herein in its entirety.

BACKGROUND

Modern mobile devices (e.g., smartphones) may contain many applications. Certain applications may be designed to enable a user to interact with or communicate with other users. For instance, in addition to providing the capabilities of placing phone calls and sending SMS text messages, modern mobile devices may contain communication applications for composing email messages, instant messages, and for initiating video calls and video conferences. As modern mobile devices become more integrated with modern day life, the number of communication applications and contacts stored on the mobile devices increases. It is not uncommon for modern mobile phones to have multiple applications that can be used to interact with other users. Having numerous applications for interacting with people may allow the mobile device to be particularly useful to the user; however, it may be difficult and time consuming for the user to find and select a desired recipient amongst all of available contacts that the user wishes to interact or communicate with.

BRIEF SUMMARY

Various embodiments of the present disclosure can provide suggested applications and/or recipients for a user of a computing device to perform communication. The suggestions can be provided on a user interface for a user to select, thereby increasing efficiency for the user, who would otherwise have to perform additional actions or keystrokes to perform the selection. A suggestion engine can use historical user interactions that include a recipient, a communication application used to communicate with the recipient, and contextual data to determine which application and/or recipients to suggest. The user interactions may occur in a variety of ways, e.g., after a content object has been selected within a host application, where a communication application is selected thereafter.

Multiple models may be used to provide the suggestions. For example, a pattern model may be generated periodically by mining for patterns in user interactions and contextual data that result in particular applications and/or recipients being selected. Such a pattern may be saved and accessed when a user request indicates that a communication might occur. As another example, recent user interactions may be dynamically retrieved and compared to a current context to identify application/recipients of recent user interactions. As another example, a heuristics model may also be used.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
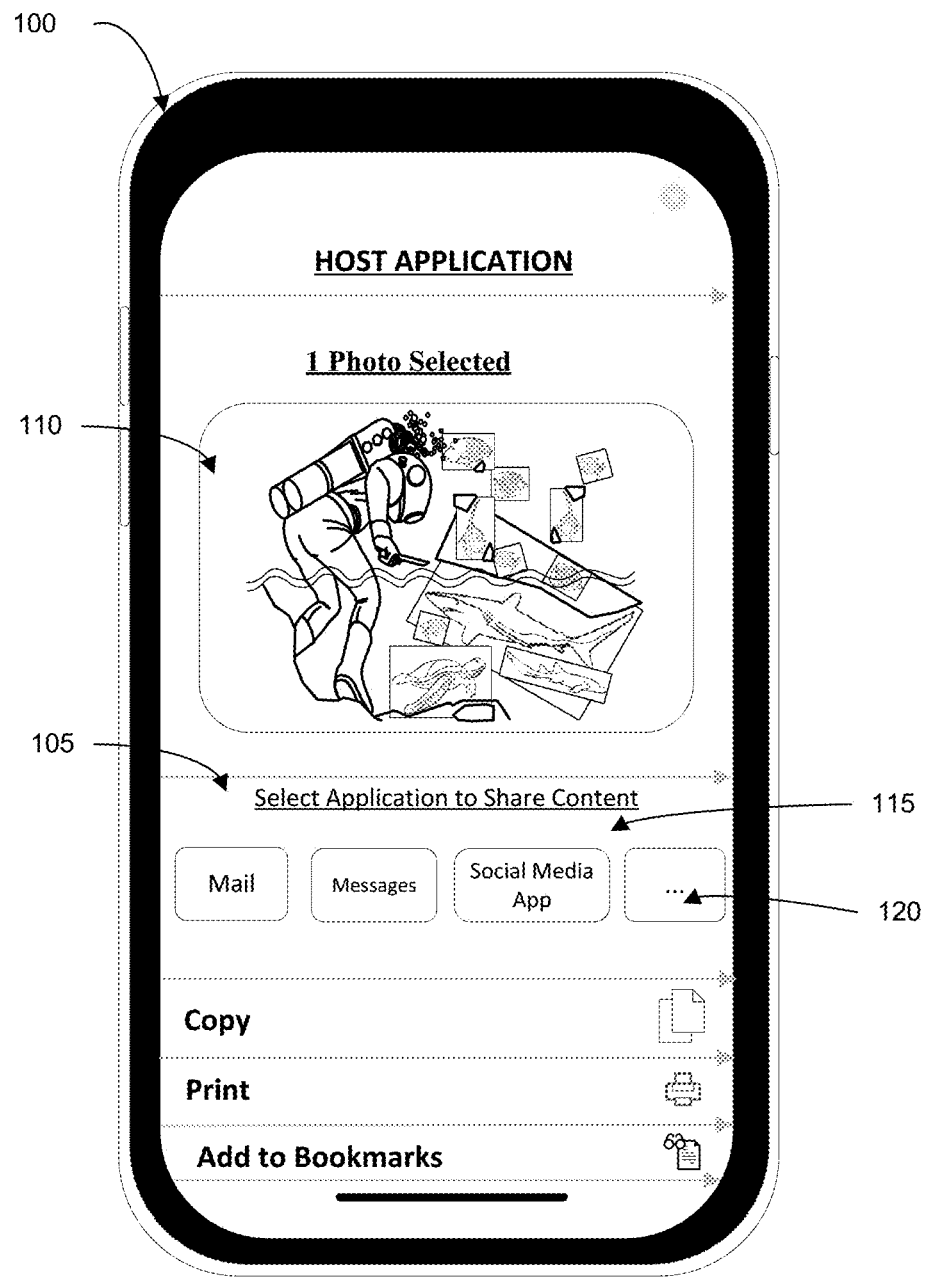
FIG. 1 shows an example user interface of an example mobile device illustrating a process for selecting an application to share content that may be improved be embodiments of the present disclosure.

Various embodiments of the present disclosure can provide suggested applications and/or recipients for a user of a computing device to perform communication. The suggestions can be provided on a user interface (UI) for a user to select, thereby increasing efficiency for the user, who would otherwise have to perform additional actions or keystrokes to perform the selection. As an example of the UI, a list (e.g., photos, icons, etc.) of suggested people may appear on one row and a list of applications (e.g., messaging apps, mail apps, document readers/organizer apps, Facebook, etc.) may appear on a row below the suggested people. The people and applications displayed on the UI may be ranked, for example from left to right, in order of importance. In addition, groups of people, for example message groups, and associated applications may also be suggested and photos or icons representing a name (e.g., family chat, workgroup, etc.) for the group may be displayed on a user interface (UI).

Various aspects of the present disclosure may also suggest the application for a user to share with a suggested person. For example, the photo or icon of the suggested person displayed on the UI may include a smaller icon representing the suggested application. While an application for sharing may be suggested, the user may be capable of overriding the suggestion and selecting a different application (also referred to as an 'app') to share with.

In order to generate suggested recipients and apps, the mobile device may store a history of the interactions that were created by the user both by simply sending messages as well as specifically sharing to people. For example, a user may send messages to other people using a messaging app. Sending the messages may trigger the mobile device to log the interactions. The interactions may be stored in a database in memory of the mobile device. Each interaction may include the application, the recipient, the content, and other features related to the context and the content that were shared.

In some implementations, proximity-based interactions may be alternatively or additionally used to predict a sharing target/application. For example, when the mobile device detects a target mobile device being pointed at, the user of the target mobile device may be included in the sharing suggestions together with the documents/features to be shared.

Various aspects of the present disclosure can examine the context (e.g., time, location, application used, the content being shared, etc.) in which sharing takes place. The context and the content can be featurized to generate a list of suggested people to share with in similar contexts in the future.

I. Example Communication Interactions

Each communication interaction may include features related to the context and any content that was shared, as well as the recipient of the sharing. For example, interactions may include a source (host) application, a target (communication) application, content type of any content shared, interaction type (e.g., mail or messaging), recency of interaction, temporal encodings (e.g., particular time and date), as well as other features. Each interaction may be stored in a database in the memory of a device (e.g., a mobile device). The database may store all communication interactions for a specified storage time period, for example several months. Stored interactions may "age out" after the storage time period expires and be removed from the database.

In some examples, interactions may be initiated by a sharing operation to share a content object, for example, pushing a share button on a user interface (UI) of the mobile device. Initiating the sharing operation may also trigger a prediction of a sharing recipient and a target communication application to perform the sharing communication, for example, a mail program, a messaging program, etc. In other examples, a user can already have selected a communication, and thus only the recipient may need to be suggested.

A. Content Sharing Example

In some embodiments, a communication interaction may involve sharing a content object from a host application, e.g., a photo application, web browser, social media application, etc. A user interface associated with the host can allow a user to indicate that content should be shared. Examples of such content include photos, files, URLs, a deep link for a website (e.g., a hypertext link to a page on a Web site other than its home page), or a deep link to an application (e.g., a link to a page/window other than an app splash screen).

FIG. 1 shows an example user interface of an example mobile device 100 illustrating a process for selecting an application to share content that may be improved by embodiments of the present disclosure. As depicted, a user has selected a photo 110 for sharing. As examples, the photo may have been selected in a photo app or a camera app (e.g., after taking a photo an icon can be displayed for selecting the photo). The photo or camera app can be considered a host app. Some embodiments can use the identity of the host app (e.g., via a host identifier) to make improvements, as will be described later.

After the photo is selected, the user can provide a user request to share the photo. Such a user request can be provided in various forms of user input, e.g., selecting a button or other selection object on a screen or via a voice command. For instance, a share button can be provided on a screen that is shows the content to be shared. As an example, such a screen may show a website, where the content to be shared is a URL for the website. In some embodiments, the selection of the content object can also act as the user request to share the content object.

After receiving the user request to share the content object, a sharing routine can be invoked. The sharing routine can include a user interface 105 for selecting actions to be performed with photo 110. For instance, a list 115 of applications can be provided, e.g., for the user to communicate the content object (photo 110 in this instance). This list 115 of applications can be a default list, e.g., as configured by the user or by the manufacturer of the operating system of the device. The list 115 can be generated without regard to what host application was used to select the content object or to whether any of the applications in list 115 actually can be used to communicate photo 110, which can cause errors or user frustration. Some embodiments of the present disclosure can address such issues.

Further, the list 115 of applications may not be the application that the user wants to use. Thus, a user may need to scroll the list (e.g., if the list includes more app icons than can fit on the screen) or select a more button 120, which can provide a list of applications for the user to browse. The need for such additional actions by a user can frustrate a user.

Additionally, after the desired application is selected, the user would still need to provide the recipient to which the content object is to be shared. The user may have to scroll through a contact list or have to remember the specific name under which the desired recipient is stored. For instance, the user may want to send the content object to 'John,' but the user may have multiple contacts with that name. Again, such extra actions required of the user can cause frustration.

To address such problems, some embodiments can identify applications that a user is mostly likely going to use, and then provide an ordered list of those applications. In this manner, the sharing routine is more likely to display the desired application on the initial screen, e.g., in one of the first three slots, as is displayed in FIG. 1. Further, some embodiments can recommend a particular recipient, potentially in combination with a particular application.

B. Other Examples of Communication Interactions

Aspects of the present disclosure may also enable disambiguation of people by an electronic personal assistant (e.g., Siri™) and/or users of mobile devices that the mobile device might detect in the area. In such a situation, the communication application could be AirDrop™ or other local wireless communication protocol. Other examples include a user selecting a communication application, where a suggested recipient can be provided after the selection.

C. Interaction Features

Interactions may have a specified number of features that may be captured during the time windows. However, not every feature of the specified number may be captured for any given interaction. Some features that may be captured for an interaction are as follows.

The source (host) app may be the source of any content to be shared, e.g., as described in FIG. 1. The target (communication) app may be the app used to share content. In some cases, the source app and the target app may be the same app. In other case, the source app and the target app may be different apps. For example, the source app (i.e., the source of the content) may be a web browser and the target app to share the content may be a mail program.

The content type may be a form of a content object, for example, a video, a document, etc. A content object may have other properties, e.g., a location that the content was created or people identified within the content (e.g., in an image). Such data can be considered metadata of the content object.

The interaction type may be the mechanism for communicating the content, for example, mail, messaging, etc. The interaction type may be broader than the target app feature. For example, two different messaging target apps could have same interaction type.

A recency of interaction may be determined for any interaction, a particular type of interaction, a same exact interaction with a particular recipient with the same source app, etc. Each interaction may be timestamped at its occurrence to enable determining how recent the interaction occurred, e.g., relative to a current time.

Temporal encodings can provide a format for storing time data and may include, for example, recency, time of day, day of week, etc. Temporal encodings can provide a way of taking a particular time and breaking it off into these different components that make up that time. In some embodiments, interactions may be captured over fixed length time windows when the interactions are triggered (e.g., by sending a text, email, etc.). For example, interactions may be captured over a two-second time interval or another length time interval. Each time interval is treated like an event. One event may occur within a time interval. Thus, a single the time window may capture a single interaction.

Other features may include holiday, location, proximity, photos of scenes and/or people, photo metadata, photo graphs, URL domain/subdomain, dominant text topics, favorites. One of ordinary skill in the art will appreciate that this is not an exhaustive list. The captured interactions may be stored in a database in memory on the mobile device.

II. Example System for Suggesting Applicaitons/Recipients

Various embodiments can suggest applications and/or recipients. In the example of FIG. 1, a suggested list of applications (e.g., as an ordered list) can be provided. Additionally or instead, a list of recipients can be provided as well, e.g., in a separate row. Further, the list of recipients can be displayed as a combination icon that includes a recipient and an application. In embodiments where just a recipient is suggested, a communication application may already be selected, and thus the recipient suggestions can be based on that selected application. In the sharing example of FIG. 1, the communication application has not already been selected.

In some embodiments, the software architecture for enabling efficient sharing of a content objet can include a sharing routine and a suggestion engine. These software modules can work together to provide a user interface that provides an ordered list of communication applications and/or potentially application/recipient combinations for sharing a particular content object that has been selected using a host application. Either or both of these software modules can use gather context data (e.g., location, host identifier, time of day, etc.) so that the suggestion engine can determine the ordered list for the sharing routine to display. Context data is also referred to as features, as used above.

Figure 2:
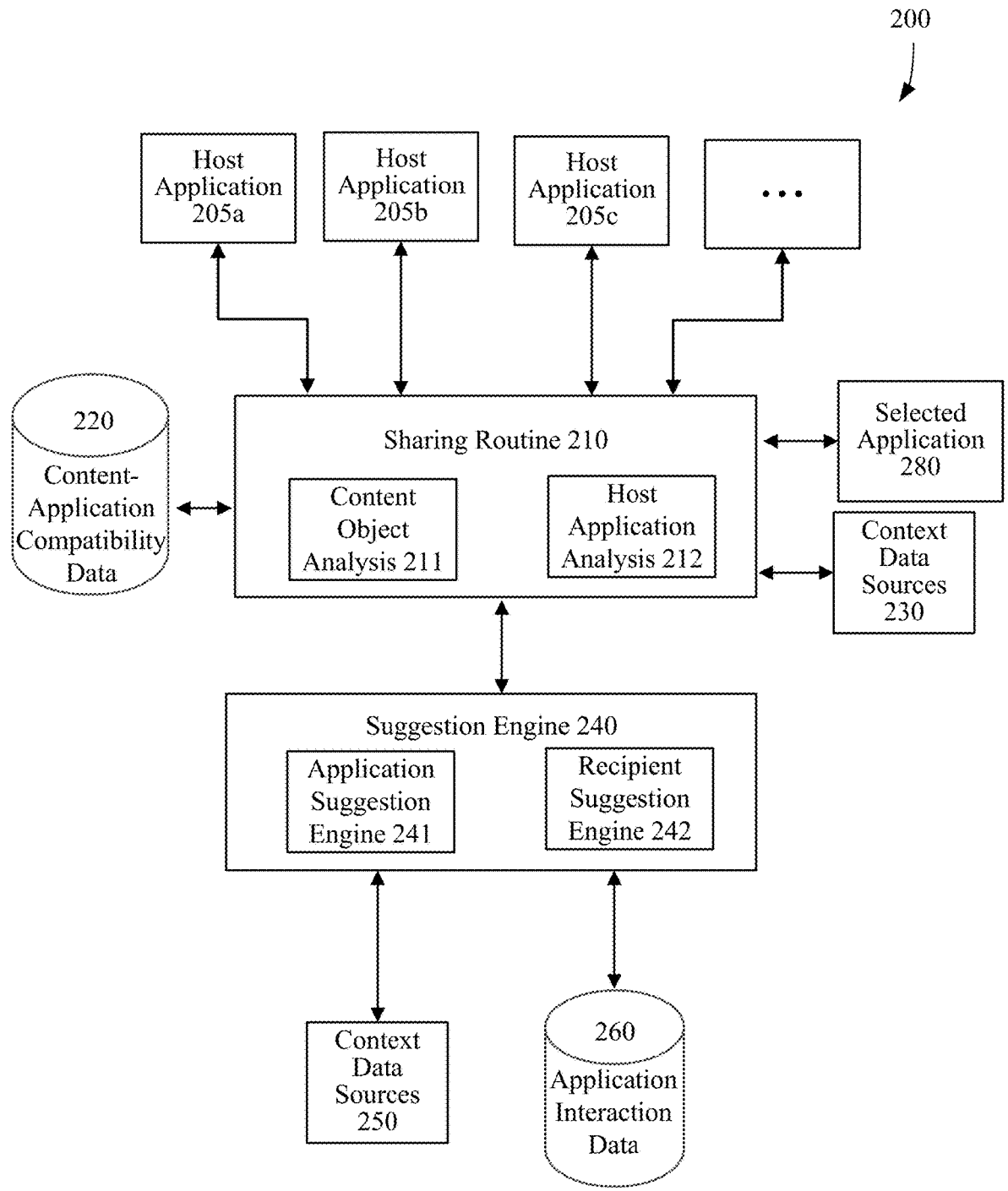
FIG. 2 shows an example system for sharing a content object using a suggested application according to embodiments of the present disclosure.

FIG. 2 shows an example system 200 for sharing a content object using a suggested application according to embodiments of the present disclosure. System 200 includes host applications 205a-205c that can interface with a sharing routine 210, which can interface with a suggestion engine 240 that suggests one or more applications (and potentially recipients), as well as a selected communication application 280 for sharing the content object. These modules can interface with various other components as part of providing this functionality on a mobile device (e.g., a phone, tablet, or wearable device, such as a watch) or a larger computer that is not mobile.

Multiple host applications 205a-205c are shown communicably coupled with sharing routine 210. Such an interface can be provided in various ways, e.g., each of the host applications can include a framework that provides a UI to initiate sharing routine. Such a framework can include a list of selectable options at a bottom of a screen of the host application. Such a list of selectable options can be part of the host application or provided by the system software. If provided by the system software, the operating system can track which host application is in operation at a given time, so that communication can occur between sharing routine 210 and the host application that is currently executing.

Accordingly, at any given time, sharing routine 210 can be invoked via a function call from a host application or via a system call in response to a user request to begin a sharing session. As part of the invocation (e.g., a user selecting a button to share a selected content object), the host application can provide a host identifier and a content identifier to sharing routine 210. The providing of such data may be via other system software, e.g., that monitors for which application is currently being used and stores associated host identifiers for applications, such that the corresponding host identifier can be retrieved and provided to sharing routine 210.

Similarly, the host application can provide information to sharing routine 210 about the selected content object, e.g., a content type, size of the content object, and a content identifier (e.g., a memory location, a file identifier, a URL, etc.). As further examples, a host application can provide preferences to sharing routine, e.g., preferences for a communication application to be used (which may specify exclusions of a communication application). Such preferences may be based on historical interactions of other users of other devices.

Sharing routine 210 can perform various operations, including a content object analysis 211 and a host application analysis 212. Each of these services can use information obtained from the host application regarding the current session, e.g., as just described above. The outputs of these analyses can be sent to suggestion engine 240, e.g., as part of a ranking of likely applications or potentially to exclude certain applications. In other examples, sharing routine 210 can save the outputs of these analyses and modify an ordered list from suggestion engine 240 before displaying the ordered list.

For example, content object analysis 211 can access a database that includes content-application compatibility data 220, which can specify which applications support which content types. For example, the data base can store a table that indicates a particular email app can support communicating an image, video, a URL, and others. But, potentially, the email app cannot support communicating a deep link to a particular page in a different application. In this manner, a non-supported application can be excluded from any list of suggested applications that are provided in a user interface for the user to select. Such exclusion can be performed by sharing routine 210 or suggestion engine 240. As further examples, other information about the content object can be determined, such as people in a photo (or otherwise mentioned or appearing in the content object), graph knowledge of associations of the content object to applications or contacts (e.g., a graph of photos that highlight associations among people in the photos), metadata associated with content object, topics mentioned in text of the content object, text in a transcription of an audio file, or webpage domains and topics.

As for host application analysis 212, it can obtain the host identifier for sending to suggestion engine 240, which can use the host application in a suggestion model to determine which communication application is mostly likely to be selected for the current host application being used. As another example, host application analysis 212 can receive statistical information from the host application about historical interactions, where such statistical information can be passed to suggestion engine 240. Such historical information can be sourced from other devices and managed by the host application, where the statistical information can be aggregated and analyzed by a host server associated with the host application such that person information is not provided outside the device. A host application could also specific particular preferences for sharing particular types of content, e.g., particular content of a host application may be designed to be used by a specific communication application.

Sharing routine 210 can also obtain current context data from context data sources 230, e.g., movement information from an inertial motion unit (IMU), time and date from a clock and calendar app, location from GPS or other location circuitry, proximity to devices of other users that are in the device's contact list, and previous applications used before the host application. To measure proximity to other devices, ranging signals (e.g., UWB) can be used, e.g., to measure time of flight, as is described in U.S. Provisional Application 62/738,915, which is incorporated by reference in its entirety. Content data sources 230 can save such data in memory, and sharing routine 210 can retrieve any such data that is desired. Alternatively, sharing routine 210 can contact the particular data sources and obtained the contextual data on-demand.

Suggestion engine 240 can receive a suggestion request from sharing routine 210, along with various information, e.g., as described above. In some embodiments, suggestion engine 240 can obtain any contextual data from context data sources 250, which may or may not be the same as context data sources 230. Thus, some contextual data can be obtained via sharing routine 210 and some contextual data can be obtained directly by suggestion engine 240.

Suggestion engine 240 can use application interaction data 260 stored in a database. Application interaction data 260 can store records of historical user interactions that can be mined for patterns and/or similarities to a current context so as to suggest a list of application that are most likely to be selected. Such a list may be ordered. Each historical interaction can be recorded as a separate time entry in the database. Such records can be saved periodically, e.g., every two seconds or other time scale where it is likely only one type of interaction would occur per time interval (temporal encoding). Each historical usage record can include any of the contextual data mentioned herein. Further details about suggestion engine 240 are provided in later sections.

As shown, suggestion engine 240 includes an application suggestion engine 241 and a recipient suggestion engine 242. The suggestions of application and recipients can operate independently or as a single suggestion engine. For example, a suggestion of a recipient can be applicable to other instances than when a content object is shared from a host application, e.g., when a communication application has already been selected. Either of these suggestion engines may utilize models described herein. When the two engines act as a single engine, a most likely pair of communication application and recipient can be identified. Such a pair can still be applicable even when the user has already selected the communication application.

III. Suggestion Engine

The suggestion engine can be implemented in various forms and use various models. For example, more than one model may be used, and the results of the models can be merged in an ensemble engine. A first type of model can run periodically (e.g., every night), but then be saved such that it is static until the next training session is performed. Such periodic generation and saving would be uncorrelated to user requests, since the periodic operation is not done in response to a user request. Such training can include a pattern mining routine that mines the historical interactions for patterns of when an application, recipient, or combination of application/recipient are selected. A second type of model can use recent interactions to generate a model on-demand when a request for a suggestion is received.

Figure 3:
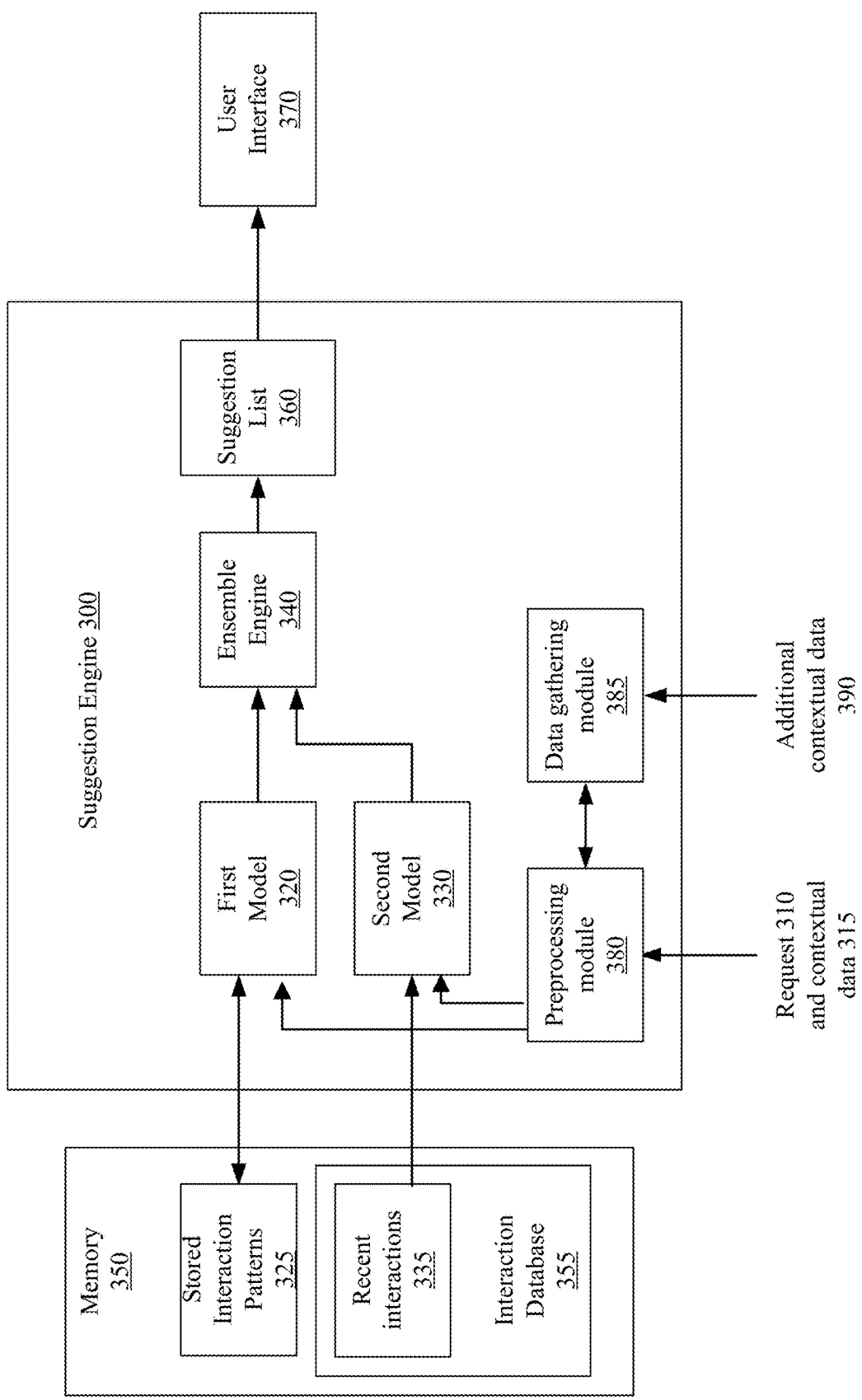
FIG. 3 is a block diagram illustrating a suggestion engine with two types of models according to aspects of the present disclosure.

FIG. 3 is a block diagram illustrating a suggestion engine 300 with two types of models according to aspects of the present disclosure. Suggestion engine 300 may include a first model 320, a second model 330, and an ensemble engine 340. The first model 320, the second model 330, and the ensemble engine 340 may be implemented by the processor of a device (e.g., mobile device 100) and may generate suggestions for recipients and/or apps, e.g., for sharing a content object as described above. In various implementations, the first model 320, the second model 330, and the ensemble engine 340 may be implemented by hardware and/or software separate from the processor of the mobile device. The first model 320 and the second model 330 may each correspond to an application suggestion engine, a recipient suggestion engine, or a combination of both.

The first model 320 may be a pattern model that uses stored interaction patterns 325, which can be determined from historical interactions in an interactions database 355 of memory 350. The stored interaction patterns 325 can be generated periodically, e.g., as described above for the first type of model. A pattern mining engine (not shown) can retrieve the historical interactions from interaction database 355, identify interactions patterns, and then store the interaction patterns 325 in memory 350. Then, when a request 310 is received, the first model can retrieve any relevant interaction patterns (or all the patterns and then identify any relevant ones), where relevancy can be determined based on contextual data 315. Contextual data 315 may include any of the various data described herein, e.g., a host app identifier, a content identifier, a type of a content object, a communication application that has already been selected (e.g., when only a recipient needs to be determined), location, etc.

The second model 330 may be generated when a prediction is triggered, as opposed to using a stored model, e.g., as stored interaction patterns 325 are used. When a prediction is triggered, the second model 330 may retrieve a number of the most recent interactions 335 from the interaction database 355 in the memory 350. Similarities between the current context and the recent interactions 335 can be analyzed to determine one or more likely communication applications, recipients, or combinations of the two. For example, the recent interactions 335 can be organized into a plurality of clusters, where each cluster has a same set of contextual data. Then, a distance from the current contextual data to the clusters can be determined. A frequency and distance to the nearest clusters can be used to determine the most likely communication applications, recipients, or combinations of the two. Accordingly, a nearest neighbor algorithm, e.g. K Nearest Neighbors algorithm, may be executed to identify interactions that are nearest neighbors to the current context. Recipients and apps for a user to share with may be suggested based on probabilities of the recent interaction being similar to the current context.

Accordingly, interaction data for generating suggestions may be stored and retrieved from the interaction database 355. A pattern mining engine may operate on the interaction interactions 335 to identify patterns (e.g., sets of items and that may be common to a number of interactions). Using the identified patterns, the pattern mining may generate rules and store the rules as interaction patterns 325. And, a second model can use only the most recent interactions (e.g., 100, 500, 1000, 2000, or more) to generate an on-demand model that determines similarities (distance) of the current context to those of recent interactions.

Suggestion engine 240 may be invoked when request 310 is received, e.g., from a sharing routine, such as sharing routine 210. Suggestion engine 240 may be invoked in other ways, e.g., from a selected communication application, which can occur in a different scenario. The request 310 can be received along with contextual data 315, e.g., obtained from context data sources 230 in FIG. 2. The reception of request 310 can trigger a prediction to be made to provide a suggested list of application, recipients, or a combination of both.

Preprocessing module 380 can receive the request 310 and any contextual data 315. Preprocessing module 380 can identify the types of data in the contextual data and perform any formatting or labeling for providing to first model 320 and second model 330. For example, a model may require data to be provided in a particular order or format. Preprocessing module 380 can also determine which model(s) to use and which order to use them. Other models may also exist, e.g., as described herein. Preprocessing module 380 can determine a type of request and/or the requesting module (e.g., a sharing routine or a communication application) to determine which model to use and the parameters provided to those models (e.g. whether to suggest applications, recipient, or a combination of both). Further, preprocessing module 380 can trigger a data gathering module 385 to obtain additional contextual data, e.g., content data sources 250 as shown in FIG. 2.

When a prediction is triggered, the first model 320 may compare the current device context specified in contextual data 315 to the patterns in the stored interaction patterns 325 to generate suggested recipients/apps, e.g., for a user to share a content object with. In response to the request trigger, the second model 330 may generate an on-demand model (e.g., a cluster model) and then compare the current device context to recent interactions.

The ensemble engine 340 may aggregate the suggestion(s) from the first model 320 and the suggestion(s) from the second model 330 to generate a final suggestion list 360. The ensemble engine 340 may order the final suggestion list 360 based on the source of the suggestions. For example, the The user interface (UI) 370 of the device may display the final suggestion list 360, e.g., as a UI of a sharing routine. The final suggestion list 360 may be displayed in graphical form, for example using icons or photos to represent the suggested recipients and an icon to represent the suggested app. A highest ranking suggested recipient may be indicated by a prominently displayed photo or icon, for example, a larger photo or icon than other suggested recipients or simply by its position in an ordered list. Further details for such a UI are provided below.

IV. Example Models

The contexts of the interactions stored in the database may be used in conjunction with various prediction models to generate suggested recipients and apps. The heuristics and models may find a best match between the current context of the device (e.g., a mobile device) and the contexts of the interactions stored in the database. At prediction time, for example when a share operation is initiated (e.g., a share button is pushed on the UI), a current context for the device may be generated. The set of features in the current context may include, for example, but not limited to, a target communication application, a time of day, features specific to the content (e.g., scenes in a photo, who is in the photo, and the like), etc.

Example models include a pattern model, a cluster model, and a heuristics model. The models may be queried with the current context and a maximum number of suggestions for recipients and apps may be generated based on at least partial matches between the current context and contexts of the stored interactions, e.g., as defined by previously stored interaction patterns or as newly generated clusters.

The heuristics may include pre-coded qualitative parameters. The pattern model and the cluster model can be trained on a mobile device, which may be considered a resource constrained environment. The pattern model and the cluster model may be unsupervised. The ensemble can predict the recipient and application a user is most likely to share with.

A. Heuristics

The heuristics may include pre-coded qualitative parameters used to generate suggestions for recipients and/or communication applications, e.g., to share a content object. The current context of the device generated when a prediction is triggered may be evaluated with respect to the qualitative parameters. For example, a heuristic engine on the device may compare the current context to the qualitative parameters to determine whether a heuristic is satisfied. If a heuristic is satisfied when the prediction is triggered, the heuristic engine may generate a suggestion for a sharing recipient and application. In some embodiments, only one heuristic may be satisfied at one time. In such an instance, a heuristics model may output only one suggestion. In other embodiments, multiple suggestions may be provided based on the number of heuristic rules that match. Various heuristics may be used to suggest people to share with. Some heuristic assumptions and results are given below. Any output of the below heuristics can be fed into another model as contextual data (features), used outright, or used in an ensemble engine, as described herein.

A recency heuristic may check whether the user interacted with a person or group within a specific time period, e.g., in the past five minutes. Such a heuristic may also check whether the person or group has had previous outgoing interactions. The outgoing interactions can be of any type or of the same type as the current request, e.g., (1) an interaction generated from a host app using a sharing routine, where the rule may be further limited to the particular host application of the current request trigger, or (2) a same communication application that is already selected. In this case, the result can be to suggest the person or group. For example, if a user finishes a phone call, video call, text, etc., with another person and decides to share some content, the person the user was on an the call or text with may be suggested as the recipient to share the content with. As another example, if the user opens a labeled photo related to another person, that person may be suggested as the recipient to share with.

A proximity heuristic can show the best wireless ad-hoc sharing recipient when recipients are nearby. Possible recipient devices can be detected using various wireless protocols, e.g., Bluetooth or UWB, as may be used for ranging. For example, based on the provided list of nearby recipients (e.g., devices/contacts) at prediction time, the heuristics model can pick the most popular recipient/application based on previous interaction and the current context. Thus, as examples, the heuristics model can provide an output of possible recipients/applications that are either fed into the other models to constrain the search space, or the ensemble engine can use the ordered list(s) from other model(s) to order the list of possible recipients/applications output from this heuristic rule.

Proximity suggestions may be further based on a specific location as opposed to just nearby, e.g., based on global positioning system (GPS) data or based on wireless ranging, e.g., using ultra-wide band (UWB) signals. Such ranging may be performed using two or more antennas so as to obtain a field of view and measure angular information.

When attempting to point at a person in the field of view of the mobile device, multiple people may be present in the field of view. Based on a list identified people in the field of view, a prediction may be made using a frequency-recency model, such as the second model 330 (e.g., K Nearest Neighbors), to determine which of the people the user has shared with most frequently in the recent past and is therefore more likely to share with at the present time. The list identified people (i.e., that are in the field of view) may be ranked based on the results of the model. Further, the specific measure of proximity can be used for ranking, alternatively or in addition to any rankings from other models.

A heuristic can be based on a calendar event. For example, a user can have a calendar event with a person or group in the near future or a calendar event currently occurring. As a result, the person or group can be suggested as the recipient.

A heuristic can relate to sharing content created at a person's house. For example, the person's address can be present in in an address book or a contact list. The content can be determined as created at that address, e.g., using GPS location when the content was created. The location can be saved with the content, e.g., as metadata with a photo. As a result, the person can be suggested as the recipient.

A heuristic can relate to a photo of a contact person. For example, the photo can be analyzed to detect a face, and the face can be matched to an image in an address book or a contact list. As a result, the person can be suggested as the recipient.

A heuristic can include a photo related to contact person(s). For example, a picture of an entity in a photo can have an inferred relationship with other persons in an address book or a contact list (e.g., relationships such as grandparents, siblings, etc.) as determined from a photos graph. As a result, those related people can be suggested. Such a relationship can be determine from a graph of photos.

A heuristic can relate to the content type of a content object. For example, the content object can be a note or document. As a result, the recipient(s) can be suggested to be known collaborators.

A heuristic can relate to a social media application (e.g., a music application, such as a streaming service). For example, if a host application for sharing content is music software, then followers/followees present in an address book or a contact list can be suggested.

One of ordinary skill in the art will appreciate that this is not an exhaustive list and that other heuristics may be used without departing from the scope of the present disclosure.

B. Pattern Model

The pattern model may tune the predictions of recipients and apps to be more specific to the user's behavior based on their past behaviors. The pattern model may operate on all interaction data stored in the database to generate rules based on identified repetitive patterns of features. The pattern model may execute overnight or during other idle times of the mobile device. The pattern model may extract data from the interactions, output another database (referred to herein as the pattern database) that can be queried at the time a prediction is being made. For each of a set of input criteria, such as source (host) app, target (communication) app, time of day, etc., the pattern database can specify a list of the people and apps to suggest.

Such a pattern model can take various other forms besides a data base of rules having certain criteria as an antecedent and outputting suggests apps/recipients as a consequent. For example, in some implementations, a neural network may be used in the pattern model.

1. Pattern Mining

According to various aspects of the present disclosure, a pattern mining process can mine and form context patterns and associative rules. Interesting correlations could be learned such as: sharing pictures of cars with a particular friend/group of friends.

A general purpose framework can take events over time and place them into windows of time. The windows may be very short, for example, two-second windows in which an interaction occurred. In some cases, the window size could be longer (e.g., 3 or 4 minutes) or shorter (e.g., 1 minute). The pattern mining algorithm can takes all the interactions that happened in the windows and across all of the interactions across all time for which data exists, and find patterns in the features across the interactions that occur inside of the windows.

The pattern model can execute on the whole interaction history using all of the stored interaction data in the database to find these rules. Based on privacy constraints, however, data may age out over time.

2. Association Rule Learning

For each window (e.g., 2 s), an interaction is stored for a given recipient, target app (e.g., communication app), and other features as discussed above. Each window may be examined, and recurring patterns of features over time can be identified. Patterns that occur a number of times that exceeds a minimum threshold may be identified as frequent patterns. For example, a pattern of sending an email to a particular recipient in the evening on certain days of the week may be identified as a frequent pattern.

Based on the frequent patterns that were found, the training algorithm can generate rules having an antecedent and a consequent. The antecedent is a state of the features (i.e., the context of an interaction) and the consequent is the suggestion (e.g., recipient and/or app). For example, the algorithm may identify a certain feature pattern that exceeds a minimum threshold in the overall number of interactions. For that feature pattern, the antecedent led to a particular consequent (e.g., a recipient and/or an app) a certain percentage of the time, e.g., above a threshold percentage.

When the pattern database is queried using the current context as the antecedent, the query searches for the rule antecedent being equal to or containing items from the current context and examines the consequent to determine if it contains a person and an app. The person and the app in the consequent may be returned as a suggestion. Suggestions may be sorted based on confidence (i.e., how likely the occurrence is) and/or frequency of occurrence.

During the antecedent matching in response to a request trigger, rules having antecedents containing any of the features in the current context may be identified. Several different rules may be identified that match the current context at least in part. Each rule may have a different number of antecedent features based on the previous pattern matching. When a prediction is initiated, the current context is captured and rules may be identified in which the antecedent contains one or more features of the current context. For example, if a current context had 10 features and a particular rule antecedent matched on six of the 10 features in the current context, because that antecedent only had six features in it, the consequent for that rule may be suggested.

Different subsets of the features in the current context may match to different antecedents. One rule might match because a user often shares to this person at a particular time, and another rule might match because the user shares with a particular person at a particular location. In each case, those rules can be sorted by a confidence metric, which is how often that antecedent applies to that consequent based on past interactions. Each identified rule may generate a different suggestion (e.g., the recipient and the target app). Ranking of the suggestions may be based on the confidence of the rules. In one embodiment for such a case, the ranking is not performed based on the amount that the antecedent overlaps with the current context (e.g., the number of matching features). When two of rules have the same value for the confidence metric, the rules may be sorted based on a support metric, which indicates amount of times that the rule has occurred in the past.

As a result of the query to a pattern database, a list of matching rules is generated. The rules are sorted first by the confidence metric and then by the support metric. Every rule may have the recipient and the target bundle ID (e.g., the target app). Each rule can be a one-to-one mapping to a suggestion. Multiple rules having the same recipient may be deduplicated.

3. Constraints on Rule-Making

The rule-making process may be constrained to stop attempting to form rules. For instance, it may be unlikely to generate a rule that includes certain information (e.g., a person for the user to share to or an application for the user to share from) in the consequent of that rule. By constraining the process to figure out associations that contain either people or applications in the consequent of the rule prior to generating rules, the complexity of the rule making process can be decreased, and thus the process can be faster and/or use less memory or processor time.

In order to form rules, each item set (e.g., features of each interaction stored in the database on the mobile device) for each interaction may be broken down into subsets of the item set. As a result, it may be possible a rule formed based on a particular subset could have something irrelevant in the consequent. In order to avoid wasting computational resource generating irrelevant rules, some embodiments can perform filtering at two levels. One level of filtering is to limit the number of item sets during the mining of frequency of an item set by constraining the item sets to contain either a recipient or a target app. Another level of filtering can be to store only rules formed that contain either the app or the person or both in the consequent.

a) During the Frequent Item Set Mining

One way to enforce such a constraint is during the frequent item set mining. A rule can include a left hand side (antecedent) and the right hand side (consequent). To identify a rule, a set of types or events is determined. Before the rule is formed, it is first determined which of those sets are frequent across all of the items occurring in the data to figure out which of these actual sets are candidates to form rules. Candidate item sets are defined as item sets having patterns that occur for a certain number of times or more in the collected data.

While it is forming item sets, the algorithm may find the frequency of each item as a singleton. Then pairs are formed with each singleton, triples are formed with each pair, and so on. For example, at the pairs level, two pairs AB and CD may be identified. At the triples level, these pairs may form item sets ABC and ABD or some other permutation thereof. At each level of item set formation, all of the items in the item set so far are examined and frequency of occurrence of the item set is determined. Item sets that contain a recipient or an app and meet a minimum occurrence threshold may be candidates for forming larger item sets. The minimum occurrence threshold may be the same for all item set levels or may be different.

The process may continue to determine which item sets are frequent given the fact that they contain a recipient or a target app. More features may be added to an item set and the frequency of the resulting pattern determined, for example, based on a minimum occurrence threshold. If, however, the frequency of the resulting pattern does not meet the minimum occurrence threshold, or if the item set does not contain a recipient or a target app, the item can be discarded and no rule is attempted based on that item set. For example, if an item set contains three items, but does not contain at least a recipient or an app, there is no need to determine its frequency of occurrence because the item set cannot produce a rule that contains the desired consequent (e.g., a recipient and/or an app). Pruning the potential rules in this manner can provide an optimization that reduces the computational cost of actually figuring out frequent item sets across all of the data.

Item set formation may continue until no larger item sets can be formed. At that point, rule formation may begin.

b) During Rule Formation

Rules may be formulated based on people/groups a user shares with. The antecedent is the first half of an if-then statement (i.e., the "if" portions) and the consequent is the second half of the if-then statement (i.e., the "then" portion). For example, "if you detect a known user within range" (antecedent portion), "then share a photo" (consequent portion). According to various aspects of the present disclosure, the rulemaking process mines and forms patterns and rules, but constrains the process to stop attempting to form rules if it is unlikely to generate a rule including information such as a person for the user to share to or an application for the user to share (or otherwise communicate) from in the consequent of that rule. Complexity is decreased by determining associations that contain either people or applications in the consequent of the rule.

Another way to enforce that constraint is in the actual rule length. The larger item set may be broken into subsets of antecedent and consequent pairs by identifying all of the subsets of that item set. Thus, a particular rule may have an item subset that includes an antecedent and a consequent. For each antecedent-consequent subset, a rule may be found. Rules are stored only if the consequent actually contains either the app or the person or both. For example, a subset can contain items ABCD and E. If a rule is formed that has AB and E in the antecedent and D and C in the consequent, but B and C are actually desired in the consequent, that rule may not be stored. Only relevant rules, i.e., rules with B and C in the consequent may be stored (e.g., when B and C are the recipient and target app). As a result, the storage footprint of all the rules can be further reduced and, at prediction time, querying speed is increased because fewer but more relevant rules are queried.

According to various aspects of the present disclosure, at prediction time when the rules are queried, a list of suggested persons and associated apps may be generated as output. In some implementations, only suggested persons or only suggested apps may be generated as output. In some implementations, the pattern model may be configured to mine for different items in the consequent and generate corresponding rules.

4. Confidence

Confidence represents the proportion of times B co-occurs with A. The notion of a confidence in a rule is, given the fact that the antecedent occurs how many times the antecedent and the consequent occur. For example, if the antecedent ABC appears 100 times and the consequent D appears only 80 times, the confidence of the antecedent ABC plus the consequent D is 80 over 100 or 0.8. In some implementations, the confidence for a rule to be used may be at least 10%.

An accuracy metric of the rules can be tracked, e.g., in a sharing context. A performance metric for accuracy can be a number of correctly suggested (contact, app) pairs for sharing/total number of (contact, app) time a sharing routine was invoked. This accuracy metric can be used when the patterns are next updated. For example, rules having an accuracy below a threshold can be discarded, and rules having an accuracy above a threshold can be automatically kept.

C. Cluster Model Using Recent Interactions

As described above, a model can use recent interactions. In some implementations, a cluster model can use past interactions and featurize them into a feature space. Then, based on the current context, the closest interactions in that feature space can be found, and the predictions (suggested recipients and/or apps) can be based on those closest interactions. The cluster model may operate on the most recent previous 1000-2000 interactions, or another number of previous interactions.

Figure 4:
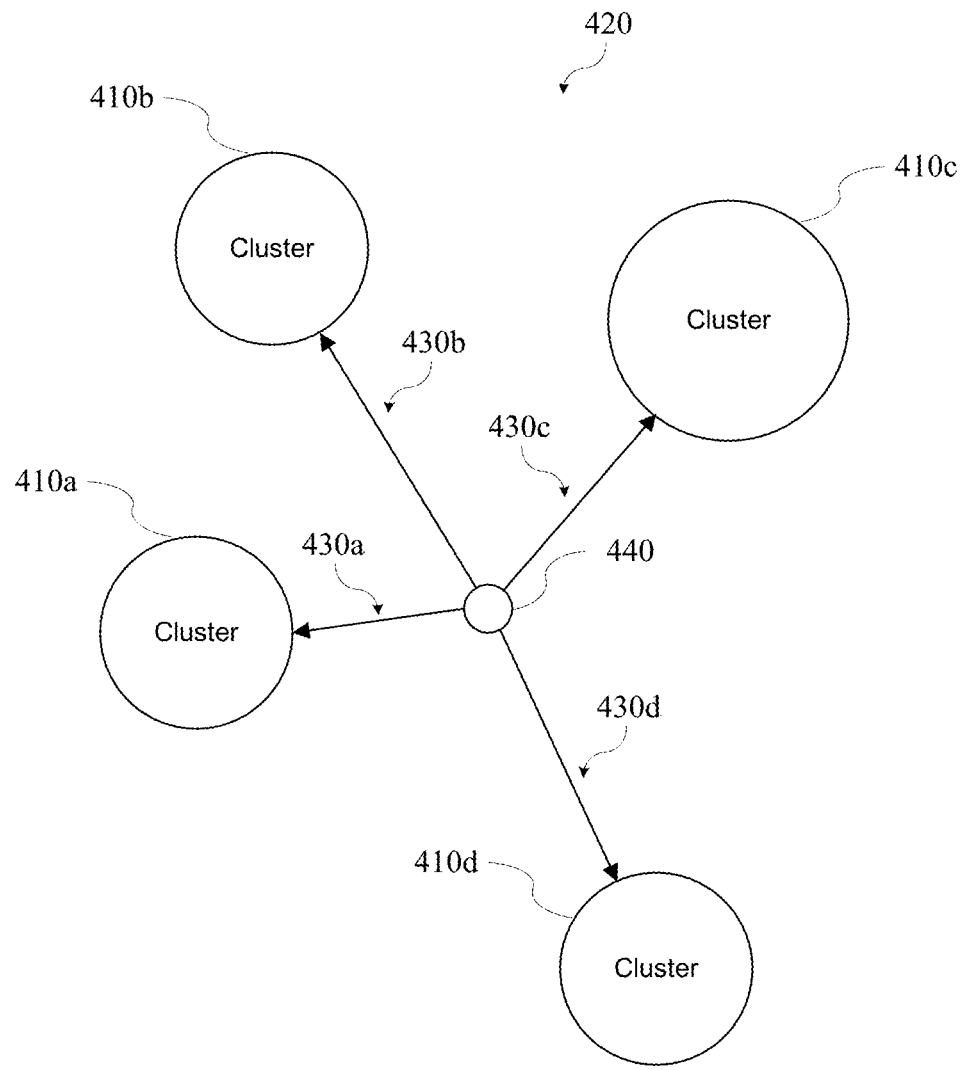
FIG. 4 is a diagram illustrating a cluster model according to aspects of the present disclosure.

FIG. 4 is a diagram illustrating a cluster model according to aspects of the present disclosure. A predetermined number of the most recent interactions may be retrieved from the memory of the device. Clusters 410a-410d of previous interactions may be formed in a feature space 420. The feature space 420 may be a multidimensional feature space where each dimension corresponds to a feature in an ordered set of features (e.g., contextual data) associated with the interactions.

Accordingly, each of the clusters 410a-410d may be generated for different combinations of communication app, recipient, and contextual data. Each interaction may not include values for all of the features in the set of features; such an interaction can be have that value set to a NULL value that does not match to any actual feature value (context data). In some implementations, interactions having a NULL value(s) can still be placed into a cluster, including ones that have more valid dimensions. Thus, a given interaction record can be placed into multiple clusters. Accordingly, each interaction in a cluster may not include all of the same features. For example, some interactions in a cluster may include features that are subsets of features in other interactions in the cluster.

The clusters 410a-410d can be formed once a request is received at the suggestion engine. A current context 440 can be placed in the feature space 430 based on the current contextual data (features). A distance 430a-430b may be determined between the current context 440 and the clusters 410a-410b. For example, the distance 430a may be the shortest distance between the current context 440 and the cluster 410a.

The size of the circles for a cluster can correspond to the number (frequency) of interactions in a cluster, The frequency along with the distances 430a-430d can provide a probability that the corresponding recipient and/or app is the one that will be selected by a user. A shorter distance means that there is a better match on the contextual data, and thus more likely that the recipient/app of the cluster will be selected. Further, a larger frequency will also provide a higher probability. The specific combination of the frequency and distance can take various forms, e.g., frequency divided by distance.

In some embodiments, different clusters will have the same recipient and/or app (or combination), but just different contextual data. To determine an overall probability for the recipient/app, the probabilities (not necessarily normalized to 1) of clusters that include the same recipient, app, or combination (depending on what is being predicted) can be summed to provide a total probability. Further, each cluster can have recency factor based on an average difference in time of the interactions in a cluster from the current time. This recently factor can act as a multiplicative factor that multiplies the probability determined from the frequency and distance to obtain an adjusted probability for each cluster. Recency may be the time delta between the timestamp on the interaction features and the prediction trigger.

The determination of the probabilities can be limited to the K nearest clusters, as these will be the ones with the highest probability. Since further clusters will not contribute significantly to a total probability for a recipient/app, they can be ignored.

Accordingly, when a prediction is triggered, for example by initiating a sharing operation, the number of previously stored interactions may be retrieved from the database and a number of nearest neighbors identified. The previous interactions may form a feature space for the various features of the interactions. A clustering approach may be used (e.g., the K Nearest Neighbors (KNN) algorithm and the underlying implementation may be the K Dimensional tree (KD tree)) to identify interactions that are nearest neighbors to the current context. The KNN algorithm may identify a number of nearest neighbors, for example 100 or another number of nearest neighbors, based on a search for context-based features (e.g., time of day, day of week, source (host) app identifier, etc.) as well as recency.

The KNN algorithm may examine the interactions based on the current context and find the closest cluster of interactions to the current context of the device that occurred in the nearest neighbor space (i.e., feature space) given the contextual features. Deduplication may be performed to remove duplicate suggestions, and the suggested recipients and apps may be ranked and output as a suggestion list based on the probabilities.

In the nearest neighbor space, several features may correspond to the same label, the label being the recipient or the target app. The features may all be at different distances from the prediction vectors. The distance and the frequency at which they appear in the neighborhood may determine a probability of an interaction being a suggestion candidate. A predetermined number of neighbors may be scored and ranked on distance (e.g., recency) and frequency in neighborhood and may be output as a suggested list of recipients/apps.

Figure 5:
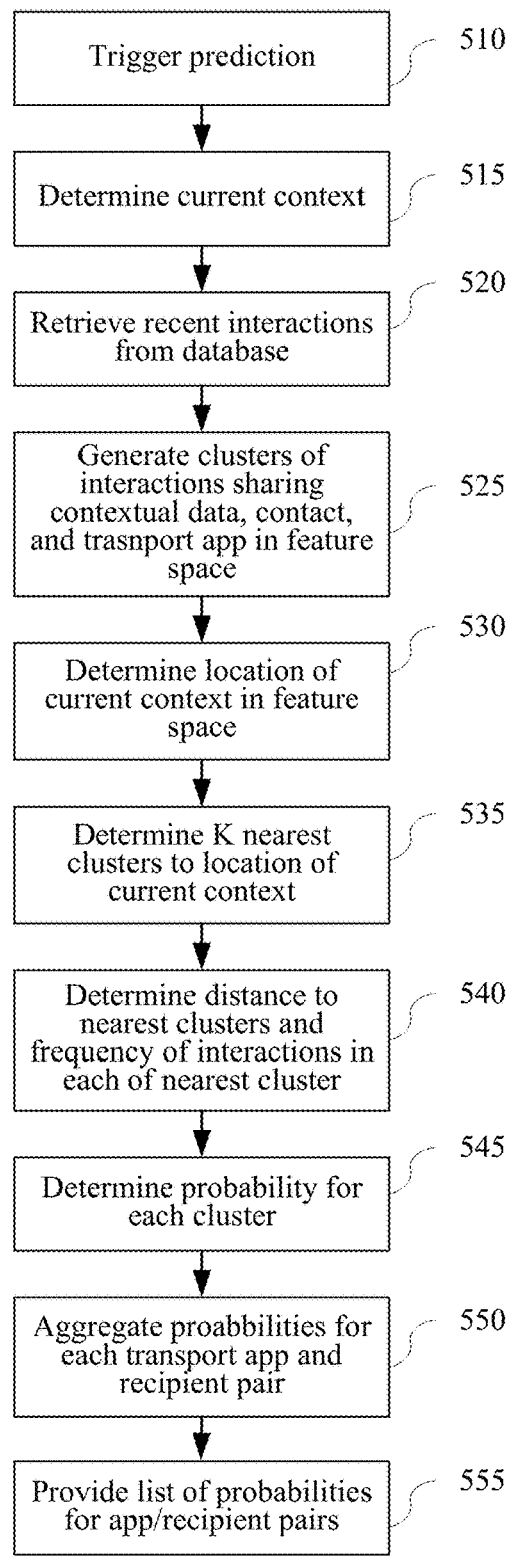
FIG. 5 is a flowchart illustrating a method for suggesting recipients and apps using a cluster model of recent interactions according to aspects of the present disclosure.

FIG. 5 is a flowchart illustrating a method for suggesting recipients and apps using a cluster model of recent interactions according to aspects of the present disclosure. The cluster model may operate on the most recent previous 1000-2000 interactions, or another number of previous interactions stored in the database. The cluster model may be triggered at prediction time, load the number of previous interactions, and provide a list of probabilities for recipients and/or applications for the user to communicate (e.g., share) based on recent interaction that are the similar to the current context of the device (e.g., a mobile device).

At block 510, a prediction may be triggered. The prediction may be triggered, for example by making a selection of the user interface of the device to initiate a sharing operation. The prediction may be triggered by when a sharing operation is initiated. For example, a user may select a button on a UI, for example, a share sheet icon or other button configured to initiate a sharing operation. As another example, a user may select a communication application (e.g., a messenger or email application) and select a create new message button.

At block 515, the current context of the mobile device may be determined. When the prediction is triggered, the device may capture the current context. The current context of the device may include time, location, application used, the content being shared, etc., and may be represented as a multidimensional point in feature space. Example features are described throughout.

At block 520, interactions may be retrieved from the database. A predetermined number, for example 1000-2000, of the most recent interactions may be retrieved. The retrieved interactions may form a feature space for the various features of the interactions. Each interaction includes the context of the device at the time of the interaction, a communication app used in the interaction, and a recipient.

At block 525, clusters of interactions sharing contextual data, contact, and communication app in feature space can be generated. Accordingly, a cluster can be generated for combinations of communication app, recipient, and contextual data. Some clusters can be grouped in a hierarchy, e.g., based on the number of differences in the contextual data. Thus, clusters that have more similar contextual data would be closer to each other in feature space.

At block 530, a location of current context is determined in feature space. The location can be determined as a multidimensional point with each axis corresponding to a different type of contextual data, and potentially including a communication app, if one has already been selected. The data may be arranged in a particular order to define the multidimensional point or tagged with labels that identify the particular axis that a piece of data corresponds, e.g., location, host app used, etc. As such, that axis or dimension can be weighted or used to filter out other clusters that do not have that communication app.

At block 535, the K nearest clusters are determined based on distances. The nearest clusters can be determined based on the distance to the clusters. The current context and the interactions may have different numbers and types of pieces of data. The distance can depend on the number of matching pieces of contextual data. When a piece of contextual data is a numerical value, a match can be considered as satisfied when the values are within a threshold. As an example, the K Nearest Neighbors (KNN) algorithm implemented with a K Dimensional tree (KD tree) may be used to identify interactions that are nearest neighbors to the current context. For example, the KNN algorithm may examine the interactions based on the current context and find clusters having the closest interactions to the current context of the device that occurred in the nearest neighbor space (i.e., feature space) given the contextual features.

At block 540, a distance is determined and a frequency of interactions in each of nearest cluster is determined. The distances may also be determined from block 535, but identifies as ones to use for later steps. The frequency of interactions in a cluster can be tracked for each cluster at time of generating the clusters. Further, a recency value for each cluster can be determined, e.g., an average delta time between the current time and historical times of each of the interactions.

At block 545, a probability is determined for each cluster. The distance and the frequency at which interactions appear in the neighborhood may determine a probability of an interaction being a suggestion candidate. A longer distance of the current context from a cluster weights the probability less. The closer distance of an interaction to a cluster and a higher number of similar interactions in the cluster increases the probability.

At block 550, probabilities are aggregated across clusters that have the same communication app and recipient. For example, two clusters may have the same communication app and recipient but slightly different contextual data. Their probabilities can be aggregated to obtained a total probability for the combination of the communication app and the recipient.

At block 555, a list of probabilities for app/recipient pairs or respective list for apps or recipients is provided. The list of probabilities can be used by other routines, e.g., a sharing routine to provide to a user, e.g., as selectable components.

D. Example Ensemble

Figure 6:
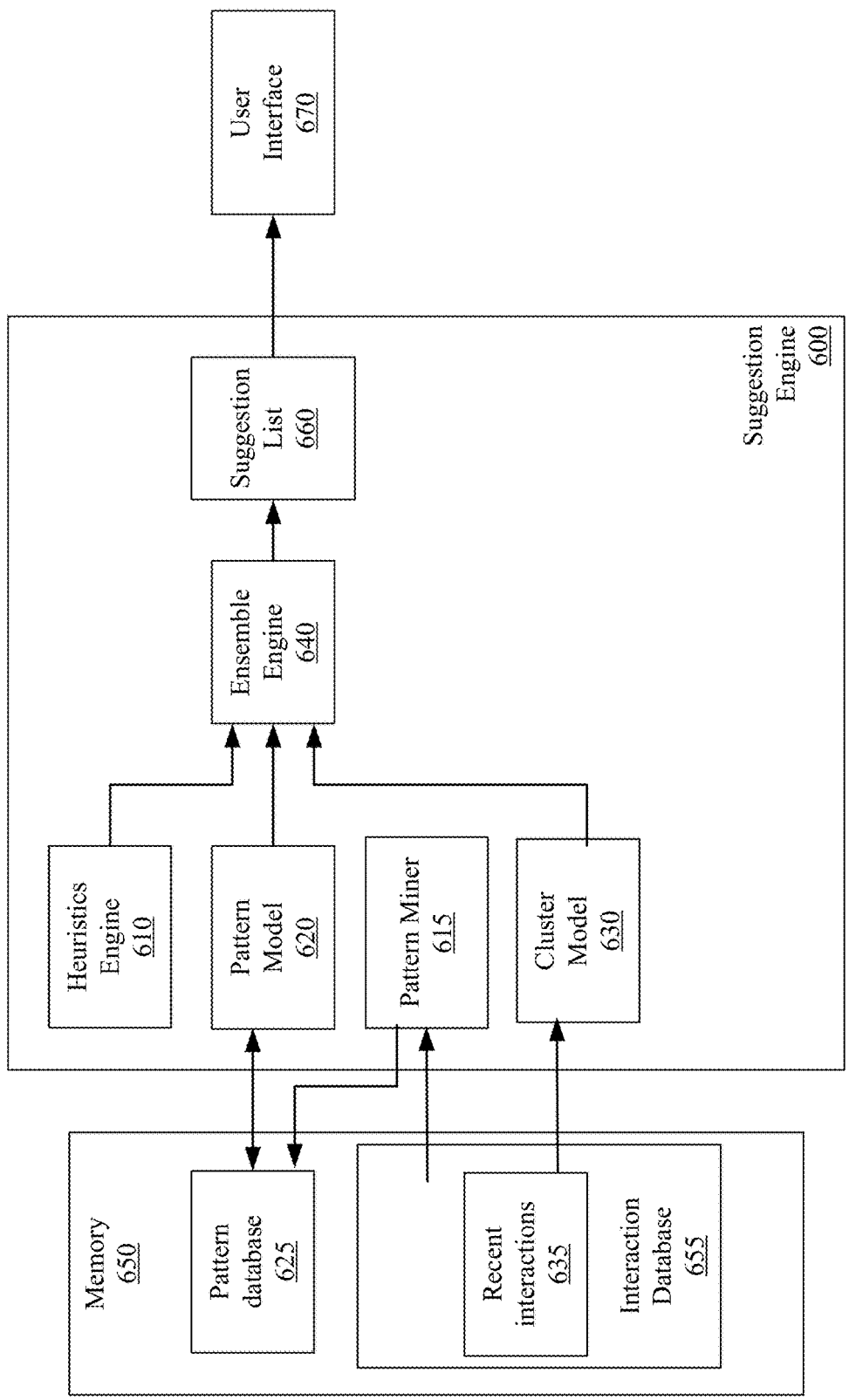
FIG. 6 is a block diagram illustrating a suggestion engine including three types of models according to aspects of the present disclosure.

FIG. 6 is a block diagram illustrating a suggestion engine 600 including three types of models according to aspects of the present disclosure. The suggestion engine 600 may include the heuristics engine 610, the pattern model 620, a cluster model 630, and an ensemble engine 640, as well as a pattern miner 615. The heuristics engine 610, the pattern model 620, the cluster model 630, and the ensemble engine 640 may be implemented by the processor of the device and may generate suggestions for recipients and apps for sharing as described above. The heuristics engine 610, the pattern model 620, the cluster model 630, and the ensemble engine 640 may be implemented by hardware and/or software separate from the processor of the mobile device. Aspects of FIG. 3 apply to FIG. 6 and thus will not be repeated.

The heuristics engine 610 may operate on pre-coded qualitative parameters. At prediction time, the current context of the device may be evaluated with respect to the qualitative parameters. If a heuristic (i.e., a set of qualitative parameters) is satisfied, the heuristic engine may generate a suggestion for a sharing recipient and application. As described above, outputs of heuristic engine 610 can also be fed back into any of the other models.

Interaction data for generating the suggestions may be stored and retrieved from the interaction database 655 stored in the memory 650 of the device. The pattern miner 615 may operate on the interaction data to identify patterns (e.g., sets of items and that may be common to a number of interactions). Using the identified patterns, the pattern miner 615 may generate rules and store the rules in a pattern database 625 in the memory 650. When a prediction is triggered, the pattern model 620 may compare the current mobile device context to the patterns in the pattern database 625 to generate suggested recipients and apps for a user to share with.

The cluster model 630 may be initiated when a prediction is triggered. When a prediction is triggered, the cluster model 630 may retrieve a number of the most recent interactions 635 from the interaction database 655 in the memory 650. A nearest neighbor algorithm, for example the K Nearest Neighbors algorithm, may be executed to identify interactions that are nearest neighbors to the current context. Recipients and apps for a user to share with may be suggested based on probabilities of the recent interaction being similar to the current context.

The ensemble engine 640 may aggregate the suggestions from the heuristics engine 610, the pattern model 620, the cluster model 630 to generate the final suggestion list 660. The ensemble engine 640 may order the final suggestion list 660 based on the source of the suggestions. A suggestion generated by the heuristics engine 610 may be ranked highest and placed at the beginning of the suggestion list. Suggestions generated by the pattern model 620 may be ranked next, and any suggestions generated by the cluster model 630 may be appended to the final suggestion list 660. In some cases, the same pair of recipient and target app might occur multiple times on final suggestion list 660. Suggestions may be deduplicated to avoid repeated instances of suggestions.

In some implementations, the suggestions may be ranked within the models by which they are generated. The suggestions may then be ranked based on the hierarchy of the heuristics and models. For example, a suggestion generated by the heuristics engine 610 may be ranked highest, followed by suggestions generated by the pattern model 620, and then any suggestions generated by the cluster model 630. The final suggestion list 660 may contain a predetermined maximum number of suggestions.

In some implementations, the suggestions may be ranked across the heuristics and the models such that a suggestion generated by either one of the models or the heuristics engine may have a highest ranking. The remaining suggestions may be ranked accordingly regardless of being generated by the heuristics or one of the models. The final suggestion list 660 may be output to a user interface (UI) 670 of the mobile device. The final suggestion list 660 may be displayed in graphical form, for example using icons or photos to represent the suggested recipients and icons to represent the suggested app.

The user interface (UI) 670 of the mobile device may display the final suggestion list 660. The final suggestion list 660 may be displayed in graphical form, for example using icons or photos to represent the suggested recipients and an icon to represent the suggested app. A highest ranking suggested recipient may be indicated by a prominently displayed photo or icon, for example a larger photo or icon than other suggested recipients.

Figure 7:
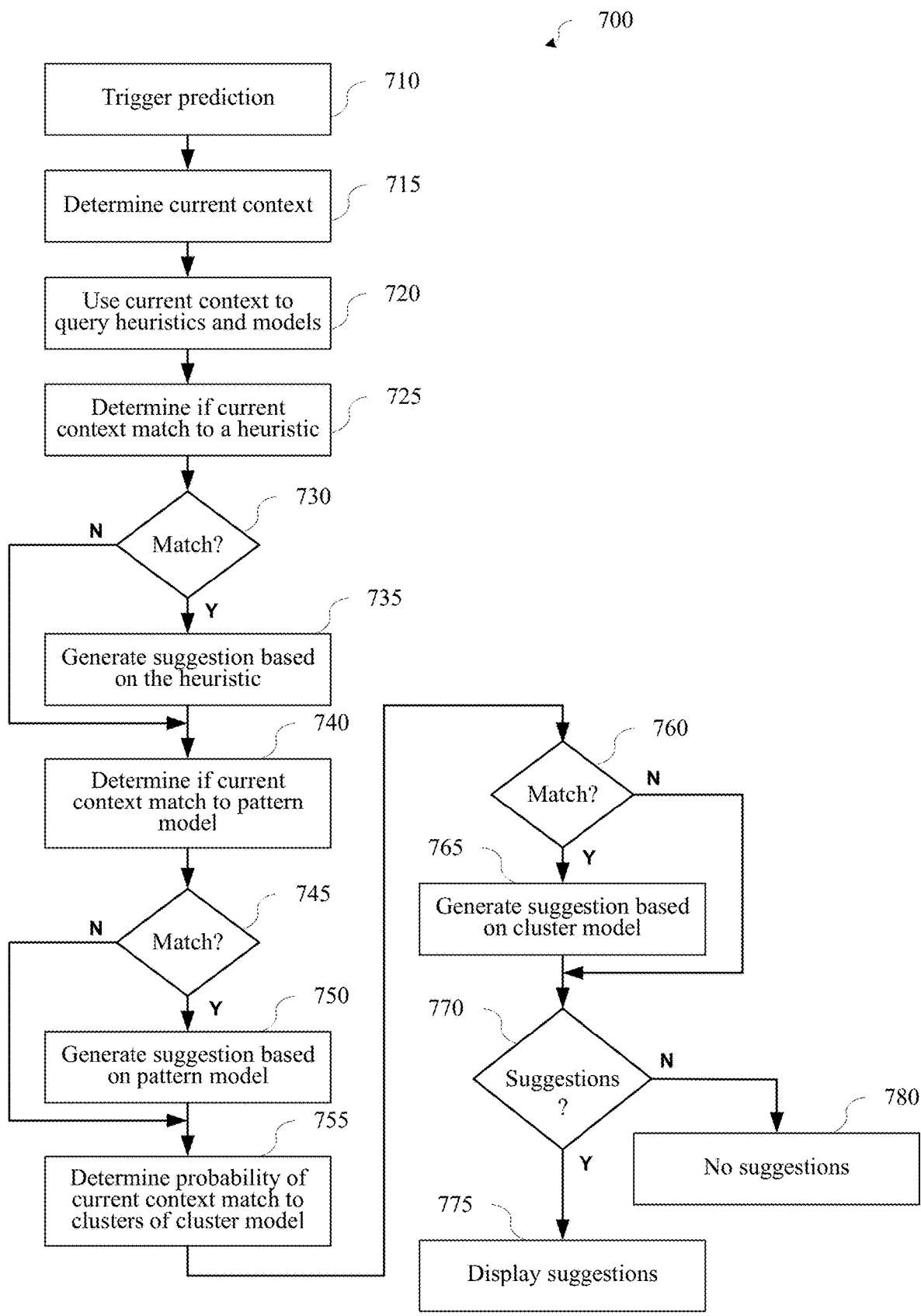
FIG. 7 is a flowchart illustrating a method for suggesting recipients and apps using an ensemble of models according to aspects of the present disclosure.

FIG. 7 is a flowchart illustrating a method 700 for suggesting recipients and apps using an ensemble of models according to aspects of the present disclosure. Block of method may be implemented in a similar manner as blocks and modules described in previous figures. Method 700 may be performed by a computing device, e.g., a mobile device.

At block 710, a trigger prediction is received. Block 710 may be performed in a similar manner as block 510.

At block 715, a current context of the device is determined. Block 715 may be performed in a similar manner as block 515.

At block 720, the current context may be used to query one or more of the models, including the heuristics model, the pattern model, and the cluster model. The query can be implemented as inputting the current context as input to the models to provide an output of suggested applications. Various steps below relate to operations done within the models. Method 700 may stop after any one of the models, e.g., if a sufficient match is identified, thereby causing method 700 to jump to block 775 to provide suggestions.

At block 725, it is determined if the current context match to a heuristic of the heuristic model. There may be multiple heuristic rules. In embodiments where only one heuristic rule is allowed to match, the heuristics can be ordered by importance.

At 730, it is determined whether a match existed. A match can be defined based on criteria of the rule. Some heuristic rules may use only certain contextual data, e.g., only a host app identifier. If a match exists, then method 700 can proceed to block 735. If not, then method 700 can proceed to block 740.

At block 735, one or more suggestions can be generated based on the heuristic. Typically, only one suggestion would be generated for matching heuristic, but some heuristic rules could specify more than one. If a sufficient number of matches are reached (e.g., to fill an allotted maximum number of suggestions), then method 700 can go to block 775.

At block 740, it is determined if the current context matches to a pattern model. A match can occur when a rule has an antecedent that matches the current context.

At 745, it is determined whether a match occurs. If a match exists, then method 700 can proceed to block 750. If not, then method 700 can proceed to block 755.

At block 750, one or more suggestions are generated based on the pattern model. The one or more suggestions can be provided from the consequents of the pattern rules that matched. If a sufficient number of matches are reached, including the heuristic matches (e.g., to fill an allotted maximum number of suggestions), then method 700 can go to block 775.

At block 755, a probability of the current context matching to clusters of a cluster model is determined. Block 755 may be performed in a similar manner as blocks 545 and 550 of method 500.

At 760, it is determined whether a match occurs. If a match exists, then method 700 can proceed to block 765. If not, then method 700 can proceed to block 770. In some embodiments, the cluster model always from at least some matches since the nearest neighbors are used, which can include interactions that are possibly distant, depending on the current context.

At block 765, one or more suggestions are generated based on the cluster model. The number of suggestions provided can dependent on the number of suggestions slots available after the heuristic and pattern models.

At 770, it is determined whether any suggestions exist. At 775, suggestions are provided if there are any. At 780, no suggestions are provided. In such a case, default applications and/or recipients may be provided.

V. Example User Interface

The suggestion list may be displayed on a user interface (UI) of the mobile device. The list may be displayed in graphical form, for example using icons or photos to represent the suggested recipients and icons to represent the suggested app. Alternatively, the suggestion list may be displayed in a list form.

If the suggestion request was triggered via a sharing routine (e.g., 210), after receiving sets of suggested applications and/or suggested recipients from the suggestion engine, the sharing routine may provide a user interface to display the suggested applications and recipients, and to receive the user's selections of a particular application and/or recipient for sharing the content object. The user interface provided by the sharing routine may display a set of selectable components (e.g., icons) corresponding to the one or more suggested applications, and/or a set of selectable components corresponding to the one or more suggested recipients, e.g., photos of the person or other avatar or icon. The user interface may have a maximum number of selectable components display at an given time. The list may be scrollable or have a button for accessing an additional list. The selectable components may be selected from a display or from voice commands, e.g., from an audible list provided by a voice assistant.

Figure 8:
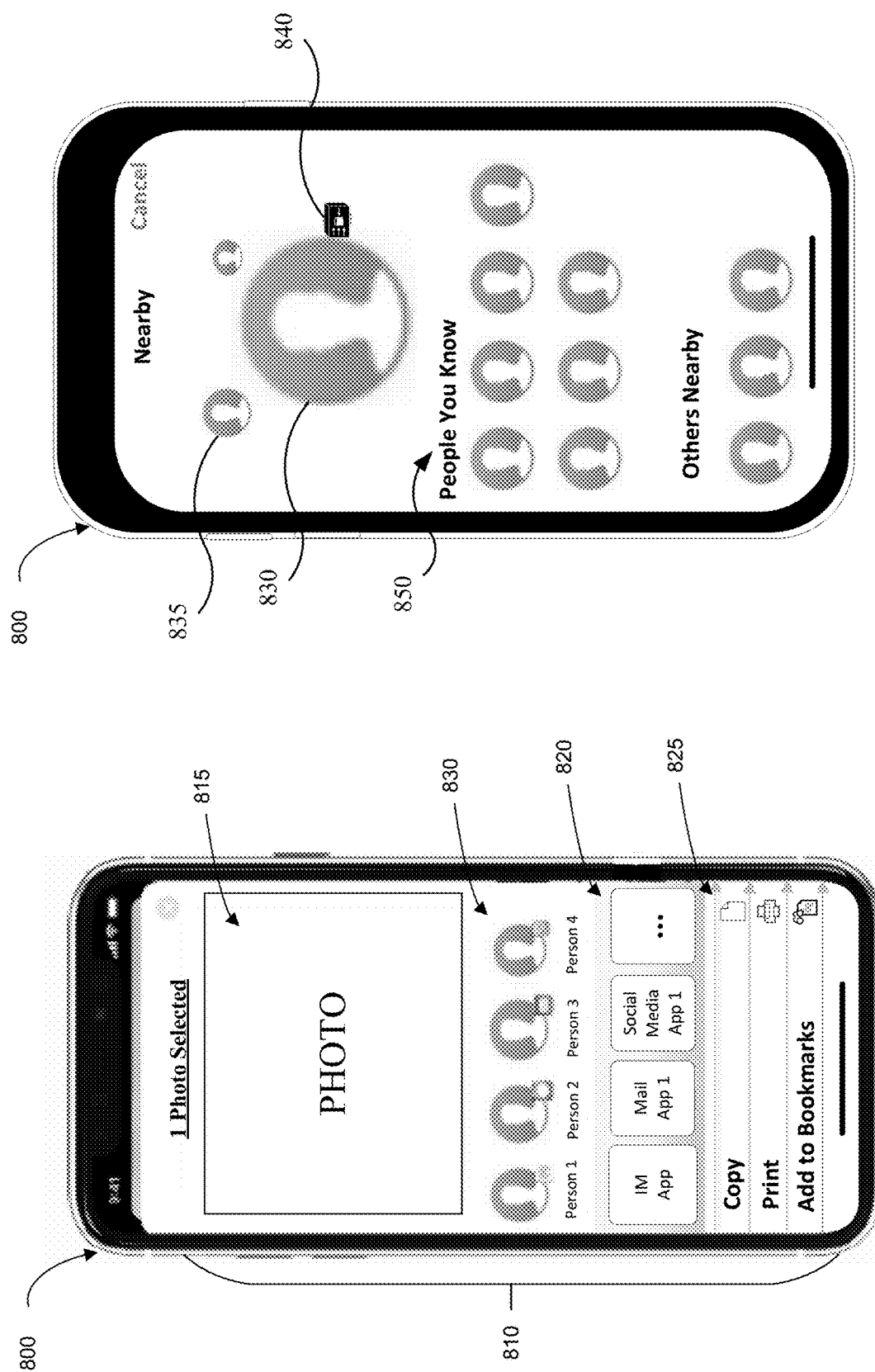
FIG. 8A shows a mobile device with a user interface displaying suggested applications and suggested application/recipients pairs according to embodiments of the present disclosure.
FIG. 8B shows a mobile device with a user interface displaying suggested recipients based on proximity according to embodiments of the present disclosure.

FIG. 8A shows a mobile device 800 with a user interface displaying suggested applications and suggested application/recipients pairs according to embodiments of the present disclosure. In this example, mobile device 800 can be executing a host application (e.g., in background) and display a window of a sharing routine, with a sharing routine user interface window 810 overlaying and partially or entirely obscuring the host application window.

User interface 810 indicates that the user of the mobile device 800 has selected a photo 815, from within the host application to be shared with one or more other applications, users, or devices. The host application may be any number of possible applications, such as photograph library applications, Internet browser applications, social media applications, etc. As noted above, the host application may provide a dedicated button, icon, or menu option to initiate the sharing user interface 810.

When the sharing routine (e.g., 210) is initiated by the host application (e.g., 205a), the sharing user interface 810 can display any one or more of: the content object 815 to be shared (e.g., for a photo or not display the content object, e.g., for a URL of a website), a user-selectable list of one or more possible applications 820 (example selectable components) that may be used to share the content object, and a list of additional capabilities 825 corresponding to other functions supported by the mobile device 800 for the content object (e.g., copy, print, add to bookmarks). Additionally, the sharing user interface window 810 may include a user-selectable list of suggested recipients 830 for sharing the content object, as other examples of selectable components. In this example, the user-selectable list of suggested recipients 830 includes recipient-application combinations, as a small app icon is displayed in combination with each recipient. The recipients may also be displayed without an associated application.

Although individual user faces are not shown in the example interface of FIG. 8A, in certain embodiments the sharing routine may be configured to look-up each of the received recipients in one or more data sources (e.g., the user's contacts list, phone book, social media contacts list, etc.) and may retrieve additional data such as an image of the recipient, nickname, or other personal data, which then may be incorporated in the recipient suggestion list 830 of the sharing user interface 810.

The sharing routine then may receive user selections of one or more applications to be used for sharing the content object and/or one or more recipients with whom the content object is to be shared. For example, the user may select one of the specified applications 820 with which to share the content object 815, or may select the ellipsis to view and select additional applications. Alternatively, the user may select one of the specified recipient-application combinations 830.

It should be understood that the suggested sets of applications 820, and the suggested recipient-application combinations 830, may correspond to the suggestions determined by the suggestion engine (e.g., 240) using the techniques discussed above, and returned to the sharing routine. The suggestions may include likelihood (probability) values that specify how the suggestions should be ordered (e.g., for each of the two lists). Alternatively, the suggestions can be sent in the order that they are to be displayed.

Accordingly, the sharing routine may rank, filter, and/or customize the suggestion results received from the suggestion engine, prior to displaying them via the sharing user interface. For example, after receiving back the application and/or recipient suggestions, the sharing routine may filter out any suggested applications that have recently been removed from the device or filter out applications that are not supported for sending a selected content object. The ranking or customization of the suggested applications and recipients may be based on the preferences/configurations of the device, user preferences, host application, and/or target application (i.e., the application used to share the content object). For instance, the total number of application or recipient suggestions may be limited by the form factor of the mobile device 800. Additionally, in some embodiments, users, host applications, and/or target applications may provide preferences for particular content objects, particular recipients, particular counterpart applications, including preference rankings and/or blacklists which may override the suggestions from the suggestion engine to prevent display of a particular recipient and/or application, based on the user, content type, host application, and/or other context data.

In another example, the sharing routine may implement a technique for promoting newly installed target applications on the mobile device 800. For instance, even though a new application recently installed on the mobile device 800 is unlikely to be suggested by the modeling of the suggestion engine, due to a lack of previous interaction data, the sharing routine may override the suggestions to include the new application in the suggested application list 820 as a way of encouraging the user to try the newly installed application.

In some embodiments, proximity information may be used to determine where a suggested recipient is displayed on a screen. As described above, proximity to other devices may be measured using ranging signals (e.g., UWB), e.g., to measure time of flight between the devices. Device 800 may include multiple antennas (e.g., 3) that can allow a determination of an angle to the other device. This spatial information can be used to point mobile device 800 at a second device, and mobile device 800 can determine a location of that second device in a radial and 360 degree perimeter around mobile device 800.

FIG. 8B shows a mobile device 800 with a user interface displaying suggested recipients based on proximity according to embodiments of the present disclosure. Mobile device 800 can determine which recipient device is directly in front of mobile device 800 and at a close range, and thus it is likely device 800 is being pointed at the recipient device. In such a situation, the recipient associated with that recipient device can be displayed as a selectable component 830, e.g., as a photo or an icon, that is larger than other suggested recipient. Other recipients can be displayed as smaller components (e.g., 835). The display of other recipients can be based on an angular relationship to mobile device 800, e.g., recipient 835 would be to the front-left of mobile device 800. The display of the highest ranking suggested recipient may also include a smaller icon 840 indicated the suggested app. Other suggested recipients 850 may be displayed in rank order elsewhere on the user interface.

VI. Example Method Using Patterns and Recent Interactions

Figure 9:
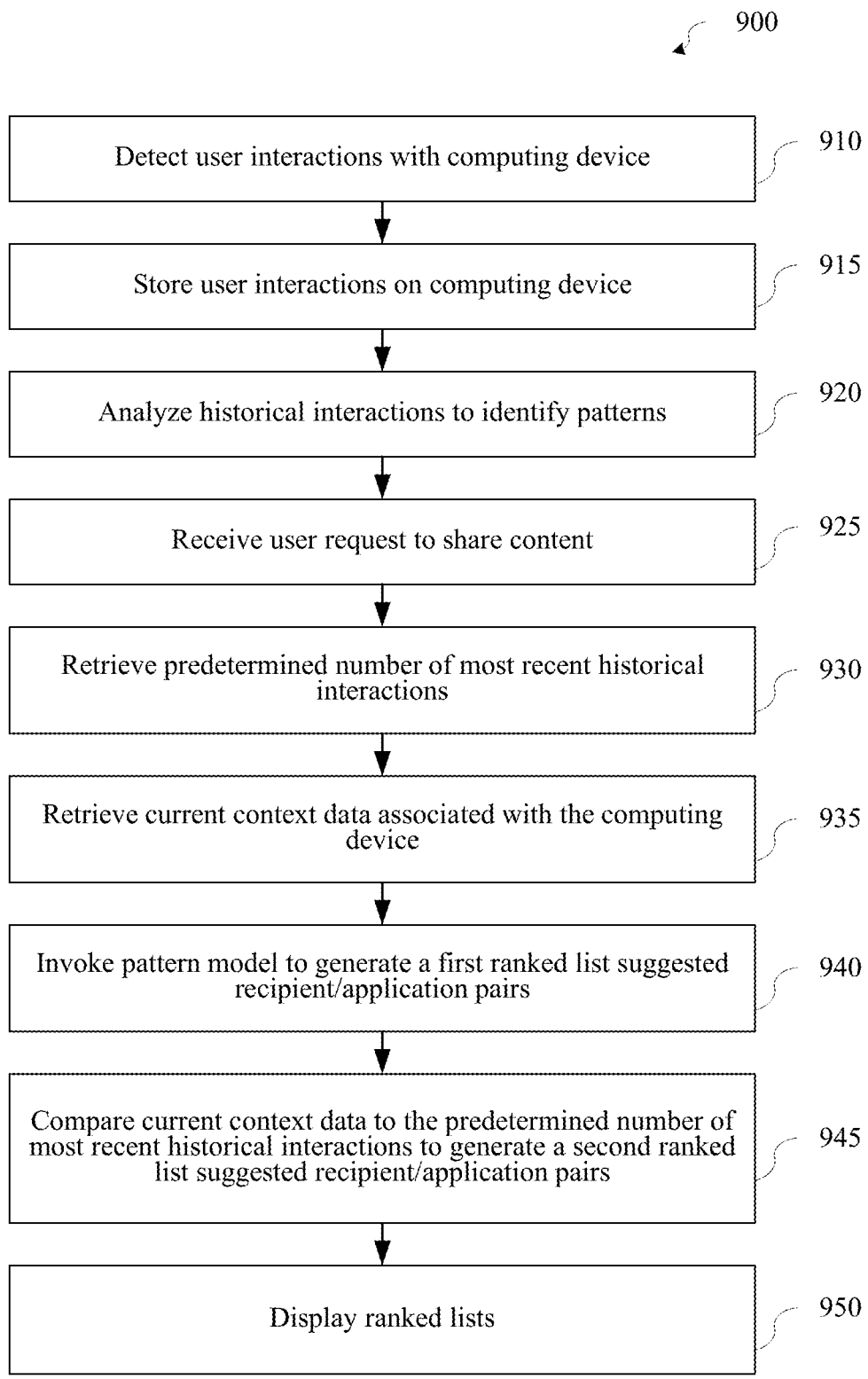
FIG. 9 is a flowchart illustrating a method for suggesting recipients and applications according to aspects of the present disclosure.

FIG. 9 is a flowchart illustrating a method 900 for suggesting recipients and applications according to aspects of the present disclosure. Method 900 can be used for suggestions in a variety of contexts, e.g., when a communication application has not been selected or when a communication application has already been selected. The operations of FIG. 9 can evaluate a current context of a computing device (e.g., a mobile device) using patterns of interactions, which can be mined periodically. A current context can also be used to identify recent interactions that are similar. Additionally, heuristics can be used. Thus, results from multiple models can be used and combined to provide suggestions. Although described for use with application/recipient pairs, method 900 may also be used for either one independently, e.g., to provide suggestions just for recipients or just for communication applications.

At block 910, user interactions with a computing device, for example a mobile phone or other mobile device, may be detected. A plurality of applications may be installed on the computing device, and interactions with any of the installed applications may be detected. Each detected user interactions may include a recipient, a communication application used to communicate with the recipient, and contextual data. The contextual data may include, for example, content type, interaction type, recency of interaction, temporal encodings, as well as other features, e.g., as described herein.

At block 915, the detected user interactions may be stored in a database on the computing device. Storing the interactions may create a database of historical user interactions. The database of historical user interactions may include historical recipients, historical communication applications, and historical contextual data. The historical database may have a finite size or time interval, e.g., 50,000 interactions or 3 months.

At block 920, the historical user interactions may be analyzed. Analyzing the historical user interactions may tune the predictions of recipients and apps to be more specific to the user's behavior based on their past behaviors. The historical user interactions may be periodically analyzed with a pattern mining technique (e.g., as described herein) to identify patterns in the historical user interactions. The analysis may be performed during idle time of the computing device, for example, overnight when the computing device is not being used. The historical user interactions may be analyzed daily, every several days, or on some other periodic schedule. All of the historical interactions stored in the database may be analyzed during the analysis.

As a result of analyzing the historical user interactions, a pattern model may be generated, e.g., including antecedent and consequent portions, as described herein. The pattern rules may be extracted from the interactions, and a pattern database may be generated and saved in the memory of the mobile device. For each of the possible criteria such as source, target, time of day, etc., the pattern database may include a list of the people and apps to suggest.

At block 925, a user request may be received indicating that a user is to use a communication application to communicate (e.g., share content) with a recipient. For example, the user may initiate a sharing operation by, for example, selecting a button on a UI, such as for a sharing routine or other button configured to initiate a sharing operation. Thus, the user request can be received while a host application is being displayed on a window of the computing device, where the user request is to share a content object. As another option a user could provide a voice command. Another example is a user providing a command (e.g., touch or voice) to start a specific communication application or just to communicate in general. In this manner, the device can interpret various user requests as an indicate that a communication is about to occur.

At block 930, in response to receiving the user request, at least a specified number N (e.g., 100, 200, 500, etc.) of the most recent historical interactions may be retrieved from the interaction database in the memory of the computing device. In some embodiments, the number of interactions may be determined dynamically, e.g., based on the time of day or location. A pattern database (model) may also be retrieved from the memory of the computing device.

At block 935, the current context data associated with the computing device may be retrieved. For example, when the user request is retrieved (e.g., initiation of a sharing operation), the current context of the computing device may be captured. Examples of contextual data are provided throughout the disclosure, e.g., in FIG. 2. Various hardware and software components can be used to provide the contextual data. In various embodiments, the captured current context data may be stored previous to receiving the request and then retrieved at the time of the request or dynamically determined and sent directly to a sharing routine or suggestion engine.

At block 940, the pattern model may be invoked. The current context data may be input to the pattern model, and the pattern model may compare the current context data to the patterns in the pattern database. The pattern model may generate a first ranked list of suggested pairs of communication applications and recipients. In some embodiments, the first ranked list may be empty, e.g., if not antecedence in the pattern rules match the current context.

At block 945, the current context data may be compared to contextual data of the specified number (N) of most recently historical interactions to generate a second ranked list of suggested pairs of communication applications and recipients. This use of and comparison to recent interactions may be performed as described in FIGS. 4 and 5. The comparison may generate a second ranked list of suggested pairs of communication applications and recipients. In some embodiments, the second ranked list always includes at least one application/recipient pair.

As described in section IV.C, the comparing of the current context data to the historical contextual data of the N most recent historical interactions can includes generating a plurality of clusters of the N most recent historical interactions. Each of the clusters can include historical interactions having common context data (e.g., at same location, same host app, same type of content object, etc.) and a respective communication application and recipient pair. The identification of clusters can be performed by analyzing each interaction in succession or in parallel, with a cluster being defined such that parallel threads checking whether a particular interaction should be assigned to which cluster. A distance cam be determined between the current context data and each of the plurality of clusters. Then, a probability can be determined for each of the respective communication application and recipient pairs being selected based on the distance to the corresponding cluster. The probabilities can be used to generate the second ranked list, which may be capped at a specified number that may depend on the number of suggestions in the first ranked list. The ranked list may be provided in order of decreasing probabilities or the probabilities may be provided as well, so that a later routine (e.g., a sharing routine) can order them.

The use of the recent interaction can also include determining a number (frequency) of the N most recent historical interactions in each of the plurality of clusters. The probability that the respective communication application/recipient pair of the corresponding cluster is selected can be further determined based on the number of historical interactions in the corresponding cluster, e.g., as shown by the size of the circles in FIG. 4.

In some examples, a subset of the plurality of clusters have a same communication application and recipient pair but different context data. In such an example, the probabilities of the subset of clusters can be aggregated to obtain a total probability for the same communication application and recipient pair.

At block 950, a first communication application and recipient pair from the first ranked list and a second communication application and recipient pair from the second ranked list may be displayed. A user interface configured to display a plurality of selectable components may be provided. The selectable components may include the first communication application and recipient pair from the first ranked list and the second communication application and recipient pair from the second ranked list. FIGS. 8A and 8B provide examples. For example, in FIG. 8B, each of the plurality of selectable components is displayed as an aggregate icon that combines a first icon of the communication application and a second icon of the recipient, as shown in recipient-application combinations 830.

In some examples, the first communication application and the second communication application are a same communication application that has already been selected. For instance, a nearby wireless communication protocol may be selected, and a recipient can be suggested, thereby providing a suggested pair of the wireless protocol and a recipient. As another example, a messaging or communication application may be selected using a touch screen or a voice command.

In some embodiments, the recent interactions are only used if there are not sufficient matches for any heuristic rules or pattern rules. Accordingly, it can be determined whether the first ranked list of suggested pairs of communication applications and recipients contains less than a threshold number of suggested pairs. Then, when the first ranked list contains less than the threshold number of suggested pairs, the N most recent historical interactions can be retrieved and the second ranked list generated.

In some embodiments, heuristics may also be used. The current context data can be compared to one or more heuristics rules. When the current context data matches a heuristics rule, a third first communication application and recipient pair can be identified. The heuristic rule may be applied first before the other models. The user interface can provides the third communication application and recipient pair at a higher ranking than any pair from the first ranked list or the second ranked list.

In some implementations, a heuristic can include measuring a proximity distance of a recipient device to the computing device, e.g., using ranging signals to determine a time of flight between devices. The proximity distance can be part of the current context data. Applying the heuristics rule can determine whether the proximity distance is within a specified range. A first recipient corresponding to the recipient device can be provided in the third communication application and recipient pair.

In some implementations, a heuristic can include receiving a selection of a content object (e.g., a photo) to be communicated. The content object can be analyzed to identify an associated location or a facial image. For example, a location where the content was created or a face in the content. It can be determined that the associated location or facial image corresponds to a first recipient as part of applying the heuristics rule. For example, a person's address may be known or an image can be saved in a contact list. The first recipient can then be provided in the third communication application and recipient pair.

VII. Example Device

Figure 10:
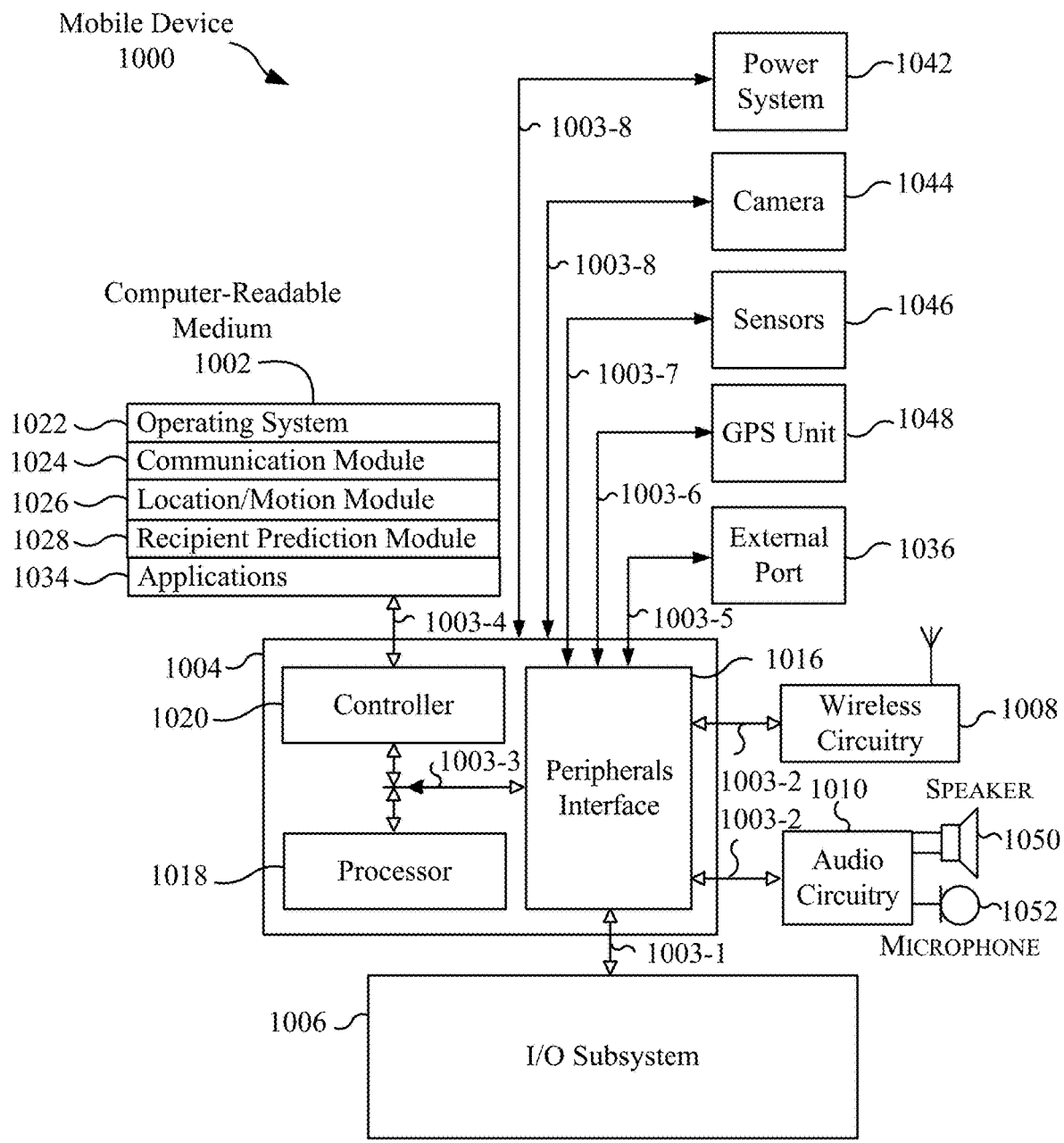
FIG. 10 is a block diagram of an example device according to aspects of the present disclosure.

FIG. 10 is a block diagram of an example device 1000, which may be a mobile device. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a vehicle display device, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, a recipient suggestion module (or set of instructions) 1028, and other applications (or set of instructions) 1034, such as a car locator app and a navigation app.

Operating system 1022 can be any suitable operating system, including iOS, Mac OS, Darwin, RTXC, LINUX, UNIX, OS X, WINDOWS, or an embedded operating system such as VxWorks. The operating system can include various procedures, a plurality of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifier) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

Recipient suggestion module 1028 can include various sub-modules or systems. Recipient suggestion module 1028 can perform all or part of methods 500 and 900.

The one or more applications 1034 on the mobile device can include any applications installed on the device 1000, including without limitation, a browser, an address book, a contact list, email, instant messaging, video conferencing, video calling, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various functions described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a plurality of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve prediction of users that a user may be interested in communicating with. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to predict users that a user may want to communicate with at a certain time and place. Accordingly, use of such personal information data included in contextual information enables people centric prediction of people a user may want to interact with at a certain time and place. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of people centric prediction services, the present technology can be configured to allow users to select to "opt in" or "opt out" of participation in the collection of personal information data during registration for services or anytime thereafter. In another example, users can select not to provide location information for recipient suggestion services. In yet another example, users can select to not provide precise location information, but permit the transfer of location zone information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users that a user may want to communicate with at a certain time and place may be predicted based on non-personal information data or a bare minimum amount of personal information, such as the content being requested by the device associated with a user, other non-personal information, or publicly available information.

Although the invention has been described with respect to specific embodiments, it will be appreciated that the invention is intended to cover all modifications and equivalents within the scope of the following claims.

What is claimed is:

1. A method comprising performing by a computing device:
   detecting user interactions with a plurality of applications installed on the computing device, each user interaction including a recipient, a communication application used to communicate with the recipient, and contextual data;
   storing the user interactions in a database on the computing device, thereby creating a database of historical user interactions that include historical recipients, historical communication applications, and historical contextual data;
   analyzing recipients, communication applications, and contextual data of the historical user interactions to identify content sharing patterns in the historical user interactions to generate a pattern model and saving the pattern model on the computing device;
   after the pattern model is generated by the computing device, receiving a user request indicating a user is to use a communication application to share content;
   responsive to the user request:
      retrieving the pattern model and a number of most recent historical interactions, and
      retrieving current context data associated with the computing device;
   invoking the pattern model with an input of the current context data to generate a first ranked list of suggested pairs of communication applications and recipients;
   comparing the current context data to the historical contextual data of the number of most recent historical interactions to generate a second ranked list of suggested pairs of communication applications and recipients; and
   providing a user interface displaying a plurality of selectable components that includes first communication application and recipient pairs from the first ranked list and a plurality of second communication application and recipient pairs from the second ranked list, wherein the first communication application and recipient pairs from the first ranked list are different than the second communication application and recipient pairs from the second ranked list.

2. The method of claim 1, wherein the pattern model is periodically generated and saved at time uncorrelated to user requests.

3. The method of claim 1, wherein the first communication application and the second communication application are a same communication application that has already been selected.

4. The method of claim 1, wherein each of the plurality of selectable components is displayed as an aggregate icon that combines a first icon of the communication application and a second icon of the recipient.

5. The method of claim 1, wherein comparing the current context data to the historical contextual data of the number of most recent historical interactions includes:
   generating a plurality of clusters of the number of most recent historical interactions, wherein each of the plurality of clusters includes historical interactions having common context data and a respective communication application and recipient pair;
   determining a distance between the current context data and each of the plurality of clusters;

determining a probability for each of the respective communication application and recipient pairs being selected based on the distance to a corresponding cluster; and generating the second ranked list based on the probabilities.

6. The method of claim 5, further comprising:

determining a number of the number of most recent historical in each of the plurality of clusters, wherein the probability of the respective communication application and recipient pair of the corresponding cluster being selected is further determined based on a number of historical interactions in the corresponding cluster.

7. The method of claim 5, wherein a subset of the plurality of clusters has a same communication application and recipient pair but different context data, the method further comprising:

aggregating the probabilities of the subset of the plurality of clusters to obtain a total probability for the same communication application and recipient pair.

8. The method of claim 1, wherein the user request is received while a host application is being displayed on a window of the computing device, and wherein a content object to share is selected using the host application.

9. The method of claim 1, further comprising:

determining whether the first ranked list of suggested pairs of communication applications and recipients contains less than a threshold number of suggested pairs, wherein, when the first ranked list contains less than the threshold number of suggested pairs, the number of most recent historical interactions are retrieved and the second ranked list is generated.

10. The method of claim 1, further comprising:

comparing the current context data to one or more heuristics rules; and when the current context data matches a heuristics rule, identifying a third communication application and recipient pair, wherein the user interface provides the third communication application and recipient pair at a higher ranking than any pair from the first ranked list or the second ranked list.

11. The method of claim 10, further comprising:

measuring a proximity distance of a recipient device to the computing device, the proximity distance being part of the current context data, wherein applying the heuristics rule determines whether the proximity distance is within a specified range, and wherein a first recipient corresponding to the recipient device is provided in the third communication application and recipient pair.

12. The method of claim 10, further comprising:

receiving a selection of a content object to be communicated;

analyzing the content object to identify an associated location or a facial image; and determining the associated location or the facial image corresponds to a first recipient as part of applying the heuristics rule, and wherein the first recipient is provided in the third communication application and recipient pair.

13. A non-transitory computer readable medium having stored thereon instructions for causing one or more processors to perform operations comprising:

detecting user interactions with a plurality of applications installed on a computing device, each user interaction including a recipient, a communication application used to communicate with the recipient, and contextual data;

storing the user interactions in a database on the computing device, thereby creating a database of historical user interactions that include historical recipients, historical communication applications, and historical contextual data;

analyzing recipients, communication applications, and contextual data of the historical user interactions to identify content sharing patterns in the historical user interactions to generate a pattern model and saving the pattern model on the computing device;

after the pattern model is generated by the computing device, receiving a user request indicating a user is to use a communication application to communicate;

responsive to the user request:

retrieving the pattern model and a number of most recent historical interactions, and retrieving current context data associated with the computing device;

invoking the pattern model with an input of the current context data to generate a first ranked list of suggested pairs of communication applications and recipients;

comparing the current context data to the historical contextual data of the number of most recent historical interactions to generate a second ranked list of suggested pairs of communication applications and recipients; and providing a user interface displaying a plurality of selectable components that includes first communication application and recipient pairs from the first ranked list and a plurality of second communication application and recipient pairs from the second ranked list, wherein the first communication application and recipient pairs from the first ranked list are different than the second communication application and recipient pairs from the second ranked list.

14. The non-transitory computer readable medium as defined in claim 13, further comprising instructions to perform operations including:

comparing the current context data to the historical contextual data of the number of most recent historical interactions by:

generating a plurality of clusters of the number of most recent historical interactions, wherein each of the plurality of clusters includes historical interactions having common context data and a respective communication application and recipient pair;

determining a distance between the current context data and each of the plurality of clusters;

determining a probability for each of the respective communication application and recipient pairs being selected based on the distance to a corresponding cluster; and generating the second ranked list based on the probabilities.

15. The non-transitory computer readable medium as defined in claim 13, further comprising instructions to perform operations including:

determining whether the first ranked list of suggested pairs of communication applications and recipients contains less than a threshold number of suggested pairs, wherein, when the first ranked list contains less than the threshold number of suggested pairs, the number of most recent historical interactions are retrieved and the second ranked list is generated.

16. The non-transitory computer readable medium as defined in claim 13, further comprising instructions to perform operations including:
comparing the current context data to one or more heuristics rules; and
when the current context data matches a heuristics rule, identifying a third communication application and recipient pair, wherein the user interface provides the third communication application and recipient pair at a higher ranking than any pair from the first ranked list or the second ranked list.

17. A mobile device, comprising:
a memory configured to store processor-executable instructions; and
one or more processors configured for executing the instructions stored in the memory, the instructions being executable for causing the one or more processors to perform operations comprising:
detecting user interactions with a plurality of applications installed on a computing device, each user interaction including a recipient, a communication application used to communicate with the recipient, and contextual data;
storing the user interactions in a database on the computing device, thereby creating a database of historical user interactions that include historical recipients, historical communication applications, and historical contextual data;
analyzing recipients, communication applications, and contextual data of the historical user interactions to identify content sharing patterns in the historical user interactions to generate a pattern model and saving the pattern model on the computing device;
after the pattern model is generated by the computing device, receiving a user request indicating a user is to use a communication application to communicate;
responsive to the user request:
retrieving the pattern model and a number of most recent historical interactions, and
retrieving current context data associated with the computing device;
invoking the pattern model with an input of the current context data to generate a first ranked list of suggested pairs of communication applications and recipients;
comparing the current context data to the historical contextual data of the number of most recent historical interactions to generate a second ranked list of suggested pairs of communication applications and recipients; and
providing a user interface displaying a plurality of selectable components that includes first communication application and recipient pairs from the first ranked list and a plurality of second communication application and recipient pairs from the second ranked list, wherein the first communication application and recipient pairs from the first ranked list are different than the second communication application and recipient pairs from the second ranked list.

18. The mobile device of claim 17, wherein the one or more processors are further configured for executing the instructions stored in the memory to perform operations including:

comparing the current context data to the historical contextual data of the number of most recent historical interactions by:
generating a plurality of clusters of the number of most recent historical interactions, wherein each of the plurality of clusters includes historical interactions having common context data and a respective communication application and recipient pair;
determining a distance between the current context data and each of the plurality of clusters;
determining a probability for each of the respective communication application and recipient pairs being selected based on the distance to a corresponding cluster; and
generating the second ranked list based on the probabilities.

19. The mobile device of in claim 17, wherein the one or more processors are further configured for executing the instructions stored in the memory to perform operations including:
determining whether the first ranked list of suggested pairs of communication applications and recipients contains less than a threshold number of suggested pairs,
wherein, when the first ranked list contains less than the threshold number of suggested pairs, the number of most recent historical interactions are retrieved and the second ranked list is generated.

20. The mobile device of claim 17, wherein the one or more processors are further configured for executing the instructions stored in the memory to perform operations including:
comparing the current context data to one or more heuristics rules; and
when the current context data matches a heuristics rule, identifying a third communication application and recipient pair, wherein the user interface provides the third communication application and recipient pair at a higher ranking than any pair from the first ranked list or the second ranked list.

21. The method of claim 1, wherein generating the pattern model further comprises:
placing the historical user interactions into temporal windows of predetermined length;
analyzing the historical user interactions that occurred in the temporal windows to identify patterns of historical recipients, historical communication applications, and historical contextual data across the historical user interactions that occurred in the temporal windows.

22. The method of claim 21, further comprising:
identifying frequent patterns as patterns that occur more than a threshold number of times;
generating rules based on the frequent patterns, the generated rules having an antecedent and a consequent;
when the pattern model is invoked with the current context data, searching for the rules with the antecedent matching the current context data; and
returning recipients or applications or both in one or more consequents of one or more matching rules.

23. The method of claim 1, wherein invoking the pattern model includes querying a pattern database and matching a specified number of elements from the current context data with elements of one or more rules stored in the pattern database to identify the suggested pairs of communication applications and recipients in the first ranked list, wherein the rules correlate the specified number of elements from the current context data with pairs of communication applications and recipients.

* * * * *

UNITED STATES PATENT AND TRADEMARK OFFICE
CERTIFICATE OF CORRECTION

PATENT NO. : 11,556,546 B2
APPLICATION NO. : 16/835075
DATED : January 17, 2023
INVENTOR(S) : Saeed Abbasi Moghaddam et al.

It is certified that error appears in the above-identified patent and that said Letters Patent is hereby corrected as shown below:

In the Claims

Column 33, Claim 6, Line 9: delete "historical in each of" insert --historical interactions in each of--

Signed and Sealed this
Twenty-eighth Day of February, 2023

Katherine Kelly Vidal
*Director of the United States Patent and Trademark Office*